United States Patent
Chen

(10) Patent No.: US 12,477,146 B2
(45) Date of Patent: Nov. 18, 2025

(54) ENCODING AND DECODING METHOD, DEVICE AND APPARATUS

(71) Applicant: HANGZHOU HIKVISION DIGITAL TECHNOLOGY CO., LTD., Zhejiang (CN)

(72) Inventor: Fangdong Chen, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 184 days.

(21) Appl. No.: 17/753,341

(22) PCT Filed: Sep. 16, 2020

(86) PCT No.: PCT/CN2020/115646
§ 371 (c)(1),
(2) Date: Feb. 28, 2022

(87) PCT Pub. No.: WO2021/057578
PCT Pub. Date: Apr. 1, 2021

(65) Prior Publication Data
US 2022/0295094 A1    Sep. 15, 2022

(30) Foreign Application Priority Data

Sep. 23, 2019    (CN) .......................... 201910901352.7

(51) Int. Cl.
*H04N 19/577*    (2014.01)
*H04N 19/119*    (2014.01)
(Continued)

(52) U.S. Cl.
CPC ......... *H04N 19/577* (2014.11); *H04N 19/119* (2014.11); *H04N 19/176* (2014.11);
(Continued)

(58) Field of Classification Search
USPC ..................................................... 375/240.15
See application file for complete search history.

(56) References Cited

U.S. PATENT DOCUMENTS

| 10,264,288 B2 | 4/2019 | Hannuksela et al. |
| 2009/0092189 A1 | 4/2009 | Tsuchiya et al. |

(Continued)

FOREIGN PATENT DOCUMENTS

| AU | 2018236214 | 8/2019 |
| CN | 101005623 | 7/2007 |

(Continued)

OTHER PUBLICATIONS

Bross et al., "Versatile Video Coding (Draft 6)" *Joint Video Experts Team (JVET) of ITU-T SG 16 WP 3 and ISO/IEC JTC 1/SC 29/WG 11*, 15th Meeting: Gothenburg, SE, Jul. 3-12, 2019, JVET-O2001.

(Continued)

*Primary Examiner* — Mikhail Itskovich
(74) *Attorney, Agent, or Firm* — NORTON ROSE FULBRIGHT US LLP

(57) ABSTRACT

The present application provides an encoding and decoding method, apparatus, and device, the method for encoding and decoding includes: determining prediction values of pixel points of current image block; determining gradient values of pixel points of the current image block based on the prediction values of pixel points of the current image block; determining offset vectors of pixel points of the current image block; determining prediction compensation values of pixel points of the current image block based on the gradient values and the offset vectors of pixel points of the current image block; and determining final prediction values of pixel points of the current image block based on the prediction values and the prediction compensation values of pixel points of the current image block. The method can (Continued)

expand the range of application of the prediction compensation adjustment.

7 Claims, 12 Drawing Sheets

(51) Int. Cl.
*H04N 19/176* (2014.01)
*H04N 19/182* (2014.01)
*H04N 19/513* (2014.01)
*H04N 19/70* (2014.01)

(52) U.S. Cl.
CPC ......... *H04N 19/182* (2014.11); *H04N 19/513* (2014.11); *H04N 19/70* (2014.11)

(56) References Cited

U.S. PATENT DOCUMENTS

| | | | |
|---|---|---|---|
| 2018/0098066 A1* | 4/2018 | Lee | H04N 19/59 |
| 2018/0262773 A1 | 9/2018 | Chuang et al. | |
| 2018/0270500 A1 | 9/2018 | Li et al. | |
| 2018/0278950 A1 | 9/2018 | Chen et al. | |
| 2019/0068991 A1 | 2/2019 | Xu et al. | |
| 2019/0132606 A1 | 5/2019 | Su et al. | |
| 2019/0141333 A1 | 5/2019 | Lee | |
| 2019/0158873 A1 | 5/2019 | Xu et al. | |
| 2019/0246110 A1 | 8/2019 | Xu et al. | |
| 2019/0297341 A1 | 9/2019 | Zhou | |
| 2020/0314417 A1* | 10/2020 | Abe | H04N 19/176 |
| 2020/0351495 A1* | 11/2020 | Li | H04N 19/196 |

FOREIGN PATENT DOCUMENTS

| | | |
|---|---|---|
| CN | 101018334 | 8/2007 |
| CN | 101527854 | 9/2009 |
| CN | 103907346 | 7/2014 |
| CN | 104160706 | 11/2014 |
| CN | 104322070 | 1/2015 |
| CN | 104333756 | 2/2015 |
| CN | 104584549 | 4/2015 |
| CN | 104853191 | 8/2015 |
| CN | 105531999 | 4/2016 |
| CN | 105898296 | 8/2016 |
| CN | 106484614 | 3/2017 |
| CN | 107027339 | 8/2017 |
| CN | 104488272 | 3/2018 |
| CN | 107925775 | 4/2018 |
| CN | 108055551 | 5/2018 |
| CN | 108965869 | 12/2018 |
| CN | 109309838 | 2/2019 |
| CN | 109792526 | 5/2019 |
| CN | 109792527 | 5/2019 |
| CN | 110140355 | 8/2019 |
| CN | 111031317 | 4/2020 |
| CN | 111050168 | 4/2020 |
| EP | 0294956 | 12/1988 |
| EP | 0973336 | 1/2000 |
| EP | 2708268 | 3/2014 |
| EP | 2826531 | 1/2015 |
| RU | 2636692 | 11/2017 |
| RU | 2683165 | 3/2019 |
| RU | 2688149 | 5/2019 |
| WO | WO 2017/130696 | 8/2017 |
| WO | WO 2018/171796 | 9/2018 |
| WO | WO 2018/193968 | 10/2018 |
| WO | WO 2019/010156 | 1/2019 |
| WO | WO 2019/045427 | 3/2019 |
| WO | WO 2019/065329 | 4/2019 |
| WO | WO 2019/110120 | 6/2019 |
| WO | WO 2019/144930 | 8/2019 |

OTHER PUBLICATIONS

Chen et al., "Algorithm description for Versatile Video Coding and Test Model 6 (VTM 6)" *Joint Video Experts Team (JVET) of ITU-T SG 16 WP 3 and ISO/IEC JTC 1/SC 29/WG 11*, 15th Meeting: Gothenburg, SE, Jul. 3-12, 2019, JVET-O2002-v.

Chen et al., "Algorithm description for Versatile Video Coding and Test Model 5 (VTM 5)" *Joint Video Experts Team (JVET) of ITU-T SG 16 WP 3 and ISO/IEC JTC 1/SC 29/WG 11*, 14th Meeting: Geneva, CH, Mar. 19-27, 2019, JVET-N1002-v2.

Chen et al., "CE9-related: Simplification of cascading DMVR and BDOF processes" *Joint Video Experts Team (JVET) of ITU-T SG 16 WP 3 and ISO/IEC JTC 1/SC 29/WG 11*, 14th Meeting: Geneva, CH, Mar. 19-27, 2019, JVET-N0097-v1.

Chen et al., "Decoder-Side Motion Vector Refinement Based on Bilateral Template Matching" *Joint Video Exploration Team (JVET) of ITU-T SG 16 WP 3 and ISO/IEC JTC 1/SC 29/WG 11*, 4th Meeting: Chengdu, CN, Oct. 15-21, 2016, JVET-D0029.

Huang et al., "Non-CE4: DMVR control by reference picture type" *Joint Video Experts Team (JVET) of ITU-T SG 16 WP 3 and ISO/IEC JTC 1/SC 29/WG 11*, 16th Meeting: Geneva, CH, Oct. 1-11, 2019, JVET-P0089.

International Search Report and Written Opinion issued in corresponding PCT Application No. PCT/CN2020/115646, dated Dec. 21, 2020 (English Translation provided).

Li et al., "CE11: Results on composite reference picture (test 11.1.1, 11.1.2, 11.1.3, 11.1.4, 11.2.1 and 11.2.2)" *Joint Video Experts Team (JVET) of ITU-T SG 16 WP 3 and ISO/IEC JTC 1/SC 29/WG 11*, 11th Meeting: Ljubljana, SI, Jul. 10-18, 2018, JVET-K0156-v.

Li et al., "Non-CE4: On prediction refinement with optical flow" *Joint Video Experts Team (JVET) of ITU-T SG 16 WP 3 and ISO/IEC JTC 1/SC 29/WG 11*, 15th Meeting: Gothenburg, SE, Jul. 3-12, 2019, JVET-O0553_r1.

Liao et al., "Non-CE9: Simplification of DMVR and BDOF combination" *Joint Video Experts Team (JVET) of ITU-T SG 16 WP 3 and ISO/IEC JTC 1/SC 29/WG 11*, 14th Meeting: Geneva, CH, Mar. 19-27, 2019, JVET-N0484-v1.

Liu et al., "Non-CE9: Restriction on motion vector refinement in BDOF" *Joint Video Experts Team (JVET) of ITU-T SG 16 WP 3 and ISO/IEC JTC 1/SC 29/WG 11*, 15th Meeting: Gothenburg, SE, Jul. 3-12, 2019, JVET-O0573.

Luo, Jiancong (Daniel). "CE4: Prediction refinement with optical flow for affine mode (Test 2.1)" *Joint Video Experts Team (JVET) of ITU-T SG 16 WP 3 and ISO/IEC JTC 1/SC 29/WG 11*, 15th Meeting: Gothenburg, SE, Jul. 3-12, 2019, JVET-O0070.

Seregin et al., "AHG8: Enabling BDOF and DMVR for reference picture resampling" *Joint Video Experts Team (JVET) of ITU-T SG 16 WP 3 and ISO/IEC JTC I/Sc 29/WG 11*, 15th Meeting: Gothenburg, SE, Jul. 3-12, 2019, JVET-00242-v 1.

Sethuraman, Sriram. "Non-CE9: Header flags to disable DMVR and BDOF at finer granularities" Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0504-v1.

Xiu et al., "CE4-related: Harmonization of BDOF and PROF" *Joint Video Experts Team (JVET) of ITU-T SG 16 WP 3 and ISO/IEC ITC 1/SC 29/WG 11*, 15th Meeting: Gothenburg, SE, Jul. 3-12, 2019, JVET-O0593-r2.

Zheng et al., "CE11: Summary report on composite reference pictures" *Joint Video Experts Team (JVET) of ITU-T SG 16 WP 3 and ISO/IEC JTC 1/SC 29/WG 11*, 11th Meeting: Ljubljana, SI, Jul. 10-18, 2018, JVET-K0031-v.

"CE9-related Complexity reduction for BDOF parameters calculation" NOKIA 2019, JVET-O0612, 8 pages.

Alshin et al., "Bi-directional optical flow" *Joint Collaborative Team on Video Coding (JCT-VC) of ITU-T SG16 WP3 and ISO/IEC JTC1/SC29/WG11*, 3rd Meeting: Guangzhou, CN, Oct. 7-15, 2010, JCTVC-C204., 5 pages.

Chen et al., "Non-CE4: On Enabling Condition of BDOF and DMVR" *Joint Video Experts Team (JVET) of ITU-T SG 16 WP 3 and ISO/IEC JTC 1/SC 29/WG 11*, 16th Meeting: Geneva, CH, Oct. 1-11, 2019, JVET-P0311-v1, 3 pages.

Office Action issued is Corresponding Russian Application No. 2022106876, dated Dec. 8, 2022 ( No English Translation provided).

(56) References Cited

OTHER PUBLICATIONS

Partial Supplementary European Search Report issued in Corresponding European Application No. 20869844.9, dated Nov. 7, 2022.
Bross, B. et al., "Versatile Video Coding (Draft 5)", Joint Video Experts Team (JVET) of ITU-T SG 16 WP 3 and ISO/IEC JTC 1/SC 29/WG 11, JVET-N1001-v10, 14th Meeting: Geneva, CH, Mar. 19-27, 2019, 406 pages.
Liu, H. et al., "Non-CE9: Unified gradient calculations in BDOF", Joint Video Experts Team (JVET) of ITU-T SG 16 WP 3 and ISO/IEC JTC 1/SC 29/WG 11, JVET-O0570, 15th Meeting: Gothenburg, SE, Jul. 3-12, 2019, 2 pages.
Office Action issued in corresponding Australian Patent Application No. 2020354107, dated Feb. 27, 2023.
Park, et al. "Non-CE4 : Symmetric-MVD control considering the reference picture type", Joint Video Experts Team (JVET) of ITU-T SG 16 WP 3 and ISO/IEC JTC 1/SC 29/WG 11, JVET-O0414-r1, 15th Meeting: Gothenburg, SE, Jul. 3-12, 9 pages.
Xiu, X. et al., "CE4-related: Prediction sample padding unification for BDOF and PROF", Joint Video Experts Team (JVET) of ITU-T SG 16 WP 3 and ISO/IEC JTC 1/SC 29/WG 11, JVET-O0594, 15th Meeting: Gothenburg, SE, Jul. 3-12, 2019, 4 pages.
Office Action issued in corresponding Russian Application No. 2023113672, dated Nov. 24, 2023.
Chen et al. "Non-CE9: Mutually exclusive DMVR/BDOF at CU level—JVET—N0328.docx", *JVET*, 14th Meeting, Geneva, https://jvet-experts.org/doc_end_user/documents/14_Geneva/wg11/JVET-N0328v-.zip, Mar. 13, 2019.
Office Action issued in corresponding Canadian Application No. 3,149,785, dated Apr. 11, 2024.
Huang, H et al., "Joint solution for the reference picture conditions in DMVR and BDOF (JVET-P0089, JVET-P0191, JVET-P0311, JVET-P0415, JVET-P0546, JVET-P0598)", Joint Video Experts Team (JVET) of ITU-T SG 16 WP 3 and ISO/IEC JTC 1/SC 29/WG 11, 16th Meeting: Geneva, CH, Oct. 1-11, 2019, JVET-P1023.
Office Action issued in corresponding European Application No. 20869844.9, dated Jul. 8, 2025.

\* cited by examiner

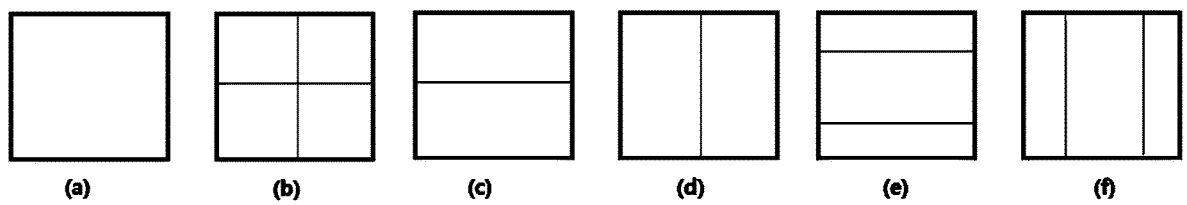
Fig. 1A
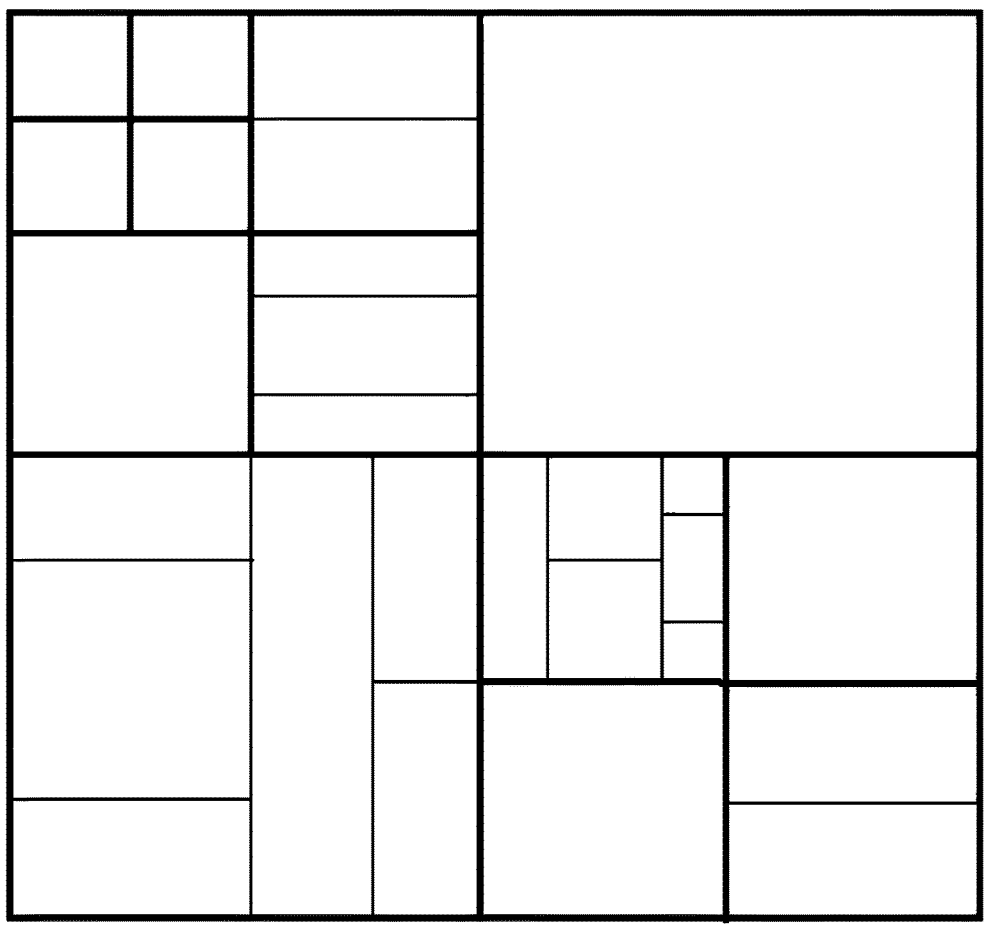
Fig. 1B
Fig. 2

▲ prediction value

○ integer pixel point

▲ prediction value

○ integer pixel point

⊘ filled integer pixel point

▲ prediction value

○ integer pixel point

⊘ filled integer pixel point

▲ prediction value

○ integer pixel point

⊘ filled integer pixel point

ENCODING AND DECODING METHOD, DEVICE AND APPARATUS

CROSS-REFERENCE TO RELATED APPLICATIONS

This application is a national phase application under 35 U.S.C. § 371 of International Application No. PCT/CN2020/115646 filed Sep. 16, 2020, which claims the benefit of priority of Chinese Patent Application No. 201910901352.7 filed Sep. 23, 2019, which are hereby incorporated by reference in their entirety.

TECHNICAL FIELD

The present application relates to video encoding and decoding technologies, and in particular, to an encoding and decoding method, apparatus, and device.

BACKGROUND

Recently, Joint Video Experts Team (JVET) conference proposed a prediction compensation adjustment method. Original prediction values of sub-blocks of a current image block are obtained based on original motion information of the sub-blocks. Compensation values of the sub-blocks are obtained based on the original prediction values. Further, a final prediction value of the current image block is obtained based on the compensation values and original prediction values of sub-blocks.

However, in practice, it is noted that current prediction compensation adjustment method is applicable only if a bidirectional prediction mode is utilized and each sub-block has the same motion vector as all pixel points therein. For an image block in which the motion vector of a sub-block is different from those of pixel points therein, prediction compensation adjustment does not apply.

SUMMARY

In view of this, the present application provides a method, an apparatus and a device for encoding and decoding.

Specifically, the present application is implemented through the following technical solutions.

According to a first aspect of an embodiment of the present application, there is provided a method for encoding and decoding, including:
 determining a prediction value of each pixel point of the current image block;
 determining a gradient value of each pixel point of the current image block based on the prediction value of each pixel point of the current image block;
 determining an offset vector of each pixel point of the current image block;
 determining a prediction compensation value of each pixel point of the current image block based on the gradient value and the offset vector of each pixel point of the current image block; and
 determining a final prediction value of each pixel point of the current image block based on the prediction value and the prediction compensation value of each pixel point of the current image block.

According to a second aspect of an embodiment of the present application, there is provided an apparatus for encoding and decoding apparatus, including:
 a first determining unit configured for determining a prediction value of each pixel point of a current image block;
 a second determining unit configured for determining a gradient value of each pixel point of the current image block based on the prediction value of each pixel point of the current image block;
 a third determining unit configured for determining an offset vector of each pixel point of the current image block;
 a fourth determining unit configured for determining a prediction compensation value of each pixel point of the current image block based on the gradient value and the offset vector of each pixel point of the current image block; and
 a fifth determining unit configured for determining a final prediction value of each pixel point of the current image block based on the prediction value and the prediction compensation value of each pixel point of the current image block.

According to a third aspect of an embodiment of the present application, there is provided an encoding side device, including a processor and a machine-readable storage medium, in which the machine-readable storage medium stores machine-executable instructions executable by the processor, and the processor is configured to execute the machine-executable instructions to implement the following steps:
 determining a prediction value of each pixel point of the current image block;
 determining a gradient value of each pixel point of the current image block based on the prediction value of each pixel point of the current image block;
 determining an offset vector of each pixel point of the current image block;
 determining a prediction compensation value of each pixel point of the current image block based on the gradient value and the offset vector of each pixel point of the current image block; and
 determining a final prediction value of each pixel point of the current image block based on the prediction value and the prediction compensation value of each pixel point of the current image block.

According to a fourth aspect of an embodiment of the present application, there is provided a decoding side device, including a processor and a machine-readable storage medium, in which the machine-readable storage medium stores machine-executable instructions executable by the processor, and the processor is configured to execute the machine-executable instructions to implement the following steps:
 determining a prediction value of each pixel point of the current image block;
 determining a gradient value of each pixel point of the current image block based on the prediction value of each pixel point of the current image block;
 determining an offset vector of each pixel point of the current image block;
 determining a prediction compensation value of each pixel point of the current image block based on the gradient value and the offset vector of each pixel point of the current image block; and
 determining a final prediction value of each pixel point of the current image block based on the prediction value and the prediction compensation value of each pixel point of the current image block.

According to an embodiment of the present application, there is provided a decoding method, including:

determining whether a current image block satisfies an enabling condition for a Bi-directional Optical Flow mode;

if the current image block satisfies the enabling condition for the Bi-directional Optical Flow mode, allowing to use the Bi-directional Optical Flow mode for the current image block;

if the current image block does not satisfies the enabling condition for the Bi-directional Optical Flow mode, refusing to use the Bi-directional Optical Flow mode;

wherein, when the Bi-directional Optical Flow mode is used for the current image block, a condition satisfied by the current image block comprises: a size of a reference picture of the current image block is the same as a size of a picture to which the current image block belongs, and the reference picture is not a long-term reference picture.

Optionally, the method further includes: if the Bi-directional Optical Flow mode is allowed to be used, determining a final prediction value of the current image block by the following steps:

determining a prediction value of each pixel point of the current image block;

determining a gradient value of each pixel point of the current image block based on the prediction value of each pixel point of the current image block;

determining an offset vector of each pixel point of the current image block;

determining a prediction compensation value of each pixel point of the current image block based on the gradient value and the offset vector of each pixel point of the current image block; and determining a final prediction value of each pixel point of the current image block based on the prediction value and the prediction compensation value of each pixel point of the current image block.

Optionally, if the Bi-directional Optical Flow mode is allowed to be used, the method further includes:

for a plurality of sub-blocks divided from the current image block, determining, for each sub-block, a prediction value of each pixel point in the sub-block and a prediction compensation value of each pixel point in the sub-block, and determining a final prediction value of the sub-block based on the prediction value of each pixel point in the sub-block and the prediction compensation value of each pixel point in the sub-block, wherein, the prediction compensation value of each pixel point in the sub-block is determined based on a gradient value and an offset vector of each pixel point in the sub-block, the gradient value of each pixel point in the sub-block is determined based on the prediction value of each pixel point in the sub-block, and the prediction value of each pixel point in the sub-block is determined based on motion information of the current image block.

Optionally, wherein, determining the gradient value of each pixel point in the sub-block comprises: filling 1 row/column of integer pixel points on the top, bottom, left and right edges of a 4*4 sub-block respectively to obtain a corresponding 6*6 block, and calculating a gradient value of each pixel point in the 4*4 sub-block based on a pixel value of each pixel point in the 6*6 block.

Optionally, wherein, when the size of the reference picture of the current image block is different from the size of the picture to which the current image block belongs, it is not allowed to use the Bi-directional Optical Flow mode for the current image block;

wherein, when the reference picture of the current image block is a long-term reference picture, it is not allowed to use the Bi-directional Optical Flow mode for the current image block;

wherein, when the size of the reference picture of the current image block is different from the size of the picture to which the current image block belongs, and the reference picture of the current image block is a long-term reference picture, it is not allowed to use the Bi-directional Optical Flow mode for the current image block.

Optionally, wherein, the current image block is a decoding block obtained by dividing using one of quadtree division, horizontal binary tree division, vertical binary tree division, horizontal trigeminal tree division, or vertical ternary tree division;

wherein, the Bi-directional Optical Flow mode refers to a mode for adjusting a motion compensation value by an optical flow method based on motion compensation values of two reference pictures of the current image block.

According to an embodiment of the present application, there is provided an encoding method, including:

determining whether a current image block satisfies an enabling condition for a Bi-directional Optical Flow mode;

if the current image block satisfies the enabling condition for the Bi-directional Optical Flow mode, allowing to use the Bi-directional Optical Flow mode;

if the current image block does not satisfies the enabling condition for the Bi-directional Optical Flow mode, refusing to use the Bi-directional Optical Flow mode;

wherein, when the Bi-directional Optical Flow mode is used for the current image block, a condition satisfied by the current image block comprises: a size of a reference picture of the current image block is the same as a size of a picture to which the current image block belongs, and the reference picture is not a long-term reference picture.

According to an embodiment of the present application, there is provided an apparatus configured to perform the methods above.

According to an embodiment of the present application, there is provided a decoding device including a processor and a machine-readable storage medium storing machine-executable instructions executable by the processor, wherein, the processor is configured to execute the machine-executable instructions to implement the methods above.

According to an embodiment of the present application, there is provided an encoding device including a processor and a machine-readable storage medium storing machine-executable instructions executable by the processor, wherein, the processor is configured to execute the machine-executable instructions to implement the method above.

According to an embodiment of the present application, there is provided a decoding method, including:

determining whether a current image block satisfies an enabling condition for a Decoder-side Motion Vector Refinement (DMVR) mode;

if the current image block satisfies the enabling condition for the DMVR mode, allowing to use the DMVR mode;

if the current image block does not satisfies the enabling condition for the DMVR mode, refusing to use the DMVR mode;

wherein, when the DMVR mode is used for the current image block, a condition satisfied by the current image block comprises: a size of a reference picture of the current image block is the same as a size of a picture to which the current image block belongs, and the reference picture is not a long-term reference picture.

Optionally, wherein, when the DMVR mode is used for the current image block, the current image block satisfies at least following conditions at the same time:
- a current mode of the current image block is a general merge mode;
- picture header control information indicates that it is allowed to use the DMVR mode for the current image block;
- the current image block uses a bidirectional prediction mode, a display order of one of two reference pictures is previous to a picture to which the current image block belongs, and a display order of the other of the two reference pictures is subsequent to the picture to which the current image block belongs, and distances between the two reference pictures and the picture to which the current image block belongs are equal;
- weighted weights of the two reference pictures of the current image block are the same;
- a size of the current image block satisfies a limiting condition; wherein, the size of the current image block satisfies a limiting condition, comprising: a width of the current image block is greater than or equal to a first threshold, a height of the current image block is greater than or equal to a second threshold, and an area of the current image block is greater than or equal to a third threshold;
- sizes of the two reference pictures of the current image block are respectively the same as the size of the picture to which the current image block belongs.

Optionally, wherein, when the DMVR mode is used for the current image block, the current image block satisfies at least the following conditions at the same time:
- a current mode of the current image block is a general merge mode;
- picture header control information allows to use the DMVR mode for the current image block;
- the current image block uses a bidirectional prediction mode, a display order of one of two reference pictures is previous to a picture to which the current image block belongs, and a display order of the other of the two reference pictures is subsequent to the picture to which the current image block belongs, and distances between the two reference pictures and the picture to which the current image block belongs are equal;
- weighted weights of the two reference pictures of the current image block are the same;
- a size of the current image block satisfies a limiting condition; wherein, the size of the current image block satisfies a limiting condition, comprising: a width of the current image block is greater than or equal to a first threshold, a height of the current image block is greater than or equal to a second threshold, and an area of the current image block is greater than or equal to a third threshold;
- sizes of the two reference pictures of the current image block are respectively the same as the size of the picture to which the current image block belongs;
- the two reference pictures of the current image block are not long-term reference pictures.

Optionally, wherein, the picture header control information indicates that it is allowed to use the DMVR mode for the current image block, comprising:
- a switch for picture header control DMVR mode is of a first numerical value; wherein the switch for picture header control DMVR mode is of a first numerical value means that picture header control allows to use the DMVR mode for the current image block;
- wherein, the size of the current image block satisfies a limiting condition, comprising: a width of the current image block is greater than or equal to 8, a height of the current image block is greater than or equal to 8, and an area of the current image block is greater than or equal to 128.

Optionally, when the current image block does not allow enabling the DMVR mode, the current image block does not satisfy at least one of the following conditions:
- a current mode of the current image block is a general merge mode;
- picture header control information allows to use the DMVR mode for the current image block;
- the current image block uses a bidirectional prediction mode, a display order of one of two reference pictures is previous to a picture to which the current image block belongs, and a display order of the other of the two reference pictures is subsequent to the picture to which the current image block belongs, and distances between the two reference pictures and the picture to which the current image block belongs are equal;
- weighted weights of the two reference pictures of the current image block are the same;
- a size of the current image block satisfies a limiting condition;
- sizes of the two reference pictures of the current image block are respectively the same as the size of the picture to which the current image block belongs.

Optionally, wherein, when the size of the reference picture of the current image block is different from the size of the picture to which the current image block belongs, it is not allowed to use a Decoder-side DMVR mode for the current image block;
- wherein, when the reference picture of the current image block is a long-term reference picture, it is not allowed to use the Decoder-side DMVR mode for the current image block;
- wherein, when the size of the reference picture of the current image block is different from the size of the picture to which the current image block belongs, and the reference picture of the current image block is a long-term reference picture, it is not allowed to use the Decoder-side DMVR mode for the current image block;
- wherein, when the current image block is not the general merge mode, it is not allowed to use the Decoder-side DMVR mode for the current image block.

Optionally, wherein, the current image block is a decoding block obtained by dividing using one of quadtree division, horizontal binary tree division, vertical binary tree division, horizontal trigeminal tree division, or vertical ternary tree division;
- wherein, the Decoder-side Motion Vector mode refers to a mode in which a difference between motion vectors is obtained by searching based on motion compensation values of two reference pictures of the current image block.

According to an embodiment of the present application, there is provided an encoding method, including:

determining whether a current image block satisfies an enabling condition for a Decoder-side Motion Vector Refinement (DMVR) mode;

if the current image block satisfies the enabling condition for the DMVR mode, allowing to use the DMVR mode;

if the current image block does not satisfies the enabling condition for the DMVR mode, refusing to use the DMVR mode;

wherein, when the DMVR mode is used for the current image block, a condition satisfied by the current image block comprises: a size of a reference picture of the current image block is the same as a size of a picture to which the current image block belongs, and the reference picture is not a long-term reference picture.

According to an embodiment of the present application, there is provided an apparatus configured to perform the methods above.

According to an embodiment of the present application, there is provided a decoding device comprising a processor and a machine-readable storage medium storing machine-executable instructions executable by the processor, wherein, the processor is configured to execute the machine-executable instructions to implement the methods above.

According to an embodiment of the present application, there is provided an encoding device comprising a processor and a machine-readable storage medium storing machine-executable instructions executable by the processor, wherein, the processor is configured to execute the machine-executable instructions to implement the method according to method above.

According to an embodiment of the present application, there is provided an electronic device, including: a processor; a memory for storing instructions executable by the processor; wherein, the processor is configured to execute the methods above.

According to an embodiment of the present application, there is provided a non-transitory storage medium having instructions stored thereon, wherein, when executed by a processor, implement the methods above.

In the method for encoding and decoding, after the prediction value of each pixel point of the current image block is determined, the prediction compensation value of each pixel point of the current image block is determined based on the gradient value and the offset vector of each pixel point of the current image block, then the final prediction value of each pixel point of the current image block is determined based on the prediction value and the prediction compensation value of each pixel point of the current image block. The prediction compensation adjustment is no longer limited to an image block using the bidirectional prediction mode, and is not limited to an image block for which the motion vector of each sub-block is the same as the motion vector of each pixel in the corresponding sub-block, which expands application scope of prediction compensation adjustment.

BRIEF DESCRIPTION OF THE DRAWINGS

FIGS. 1A-1B are schematic diagrams of block divisions according to an exemplary embodiment of the present application;

FIG. 2 is a schematic diagram of an 8-plug interpolation according to an exemplary embodiment of the present application;

DETAILED DESCRIPTION

Figure 3:
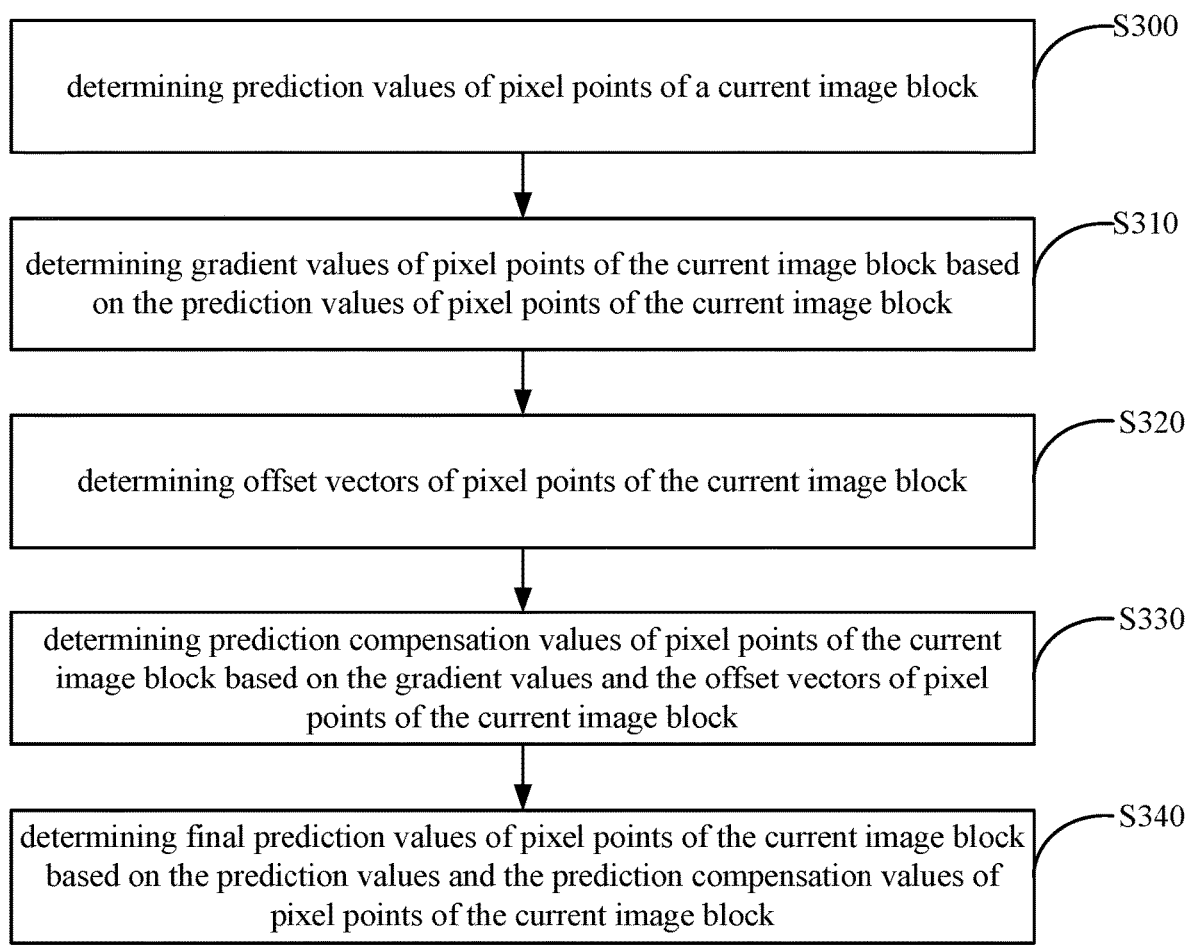
FIG. 3 is a schematic flowchart of an encoding and decoding method according to an exemplary embodiment of the present application.

The exemplary embodiments will be described in detail in association with examples as shown in the drawings. When reference is made to the drawings, the same numerals in different drawings indicate the same or similar elements unless otherwise indicated. The implementations described in the following exemplary embodiments do not encompass all implementations consistent with the present application. Rather, they are merely examples of apparatus and methods consistent with some aspects of the present application as detailed in the appended claims.

The terms used herein are only for the purpose of describing specific embodiments and are not intended to limit the present application. The singular forms of "a", "said", and "the" used in this application and the appended claims are also intended to include the plural forms, unless the context clearly indicates otherwise.

In order to enable those skilled in the art to better understand the technical solutions according to the embodiments of the present application, firstly, the block division techniques, the intra-frame sub-block division solutions in video coding standards, and some technical terms involved in the embodiments of the present application will be briefly described below.

1. Block Division Techniques in Video Coding Standards

In High Efficiency Video Coding (HEVC), a Coding Tree Unit (CTU) is recursively divided into Coding Units (CUs) using a quadtree. Whether intra-coding or inter-coding is used is determined at a CU level of a leaf node. A CU may be further divided into two or four Prediction Units (PUs), and the same prediction information is used in the same PU. After residual information is obtained after the prediction is completed, a CU may be further quadtree-divided into a plurality of Transform Units (TUs). For example, a current image block in present application is a PU.

However, the block division techniques in the newly proposed Versatile Video Coding (VVC) have changed greatly. A division structure mixing binary tree/ternary tree/quadtree divisions replaces the previous division mode. Distinctions between the concepts of CU, PU, and TU are removed, and a more flexible division mode for a CU is supported. A CU may be a division in square and/or rectangular. Firstly, quadtree division is implemented for CTU, and then binary tree division and ternary tree division may be implemented for the quadtree divided leaf nodes. As shown in FIG. 1A, there are five division modes for a CU, namely, quadtree division, horizontal binary tree division, vertical binary tree division, horizontal ternary tree division and vertical ternary tree division. As shown in FIG. 1B, CU in a CTU may be divided in one of the five division modes or any combination thereof, resulting in PUs of various shapes, such as rectangles and squares in various sizes.

2. Technical Terms

Prediction Signal: a pixel value derived from an encoded or decoded pixel, and the residual is obtained from the difference between the original pixel and the prediction pixel, and then the residual transformation quantization and coefficient coding are implemented.

For example, an inter-frame prediction signal is a pixel value of a current image block derived from a reference picture (reconstructed pixel picture). Due to the discrete pixel positions, a final prediction signal needs to be obtained through an interpolation operation. The closer the prediction pixel is to the original pixel, the smaller the residual energy obtained from subtraction between them, and the higher the coding compression performance.

Motion Vector (MV): in inter-frame coding, an MV represents the relative displacement between the current coding block and the optimal matching block in the reference image. Each block from division (which may be referred to as a sub-block) has a corresponding motion vector that is to be transmitted to a decoding side. If the MV for each sub-block, especially sub-blocks of small sizes, is encoded and transmitted, a significant amount of bits are required. In order to reduce the amount of bits for encoding an MV, in video encoding, the MV of the current block to be encoded is predicted according to MVs of adjacent encoded blocks by using spatial correlation between adjacent image blocks, and then the prediction difference is encoded. This can effectively reduce the amount of bits representing the MV. Based on this, in the process of encoding the MV of the current image block, the MV of the current image block is generally predicted by using the MVs of the adjacent encoded blocks, and then the difference between a Motion Vector Prediction (MVP) value and the real estimated value of the Motion Vector, that is, the Motion Vector Difference (MVD), is encoded, so that the amount of encoding bits of MVs is effectively reduced.

Motion Information: since a MV indicates the relative displacement between the current image block and the optimal matching block in a certain reference image, in order to accurately obtain the information pointing to the image block, in addition to the MV information, the used reference image is to be indicated through reference image index information. In video coding techniques, a reference image list is typically created for a current image based on certain principles. The reference image index information indicates which reference image in the reference image list is used for the current image block. In addition, many coding techniques also support multiple reference image lists, and therefore a further index value is required to indicate which reference image list is used. The index value may be referred to as a reference direction. In video coding, coding information related to motion, such as MV, reference picture index, and reference direction, is collectively referred to as motion information.

Interpolation: if the current MV is a non-integer pixel, the existing pixel value cannot be directly copied from the corresponding reference picture, and has to be obtained through interpolation.

As shown in FIG. 2, a pixel value $Y_{1/2}$ with an offset of ½ pixel is obtained through the interpolation with the surrounding existing pixel values X. If an interpolation filter with a number of N taps is used, the pixel value $Y_{1/2}$ is obtained through interpolation of N surrounding integer pixels. If the number of taps is 8, then, $Y_{1/2} = \Sigma_{k=-3}^{4} \alpha^k X_k$, and $\alpha^k$ is the filter coefficient, that is, a weighting coefficient.

Motion compensation: a process of obtaining all prediction pixel values of the current image block through interpolation (or copying).

Temporal Motion Vector Prediction (TMVP) mode: a mode of multiplexing motion vectors in a time domain reference picture.

Bi-directional Optical Flow (BDOF) mode: also referred to as a BIO mode, in which motion compensation value adjustment is performed based on motion compensation values of two reference pictures using an optical flow method.

Decoder-side Motion Vector Refinement (DMVR) mode: searching for a motion vector difference based on motion compensation values of two reference pictures.

Symmetric Motion Vector Difference (SMVD) mode: the motion vector difference of one direction is directly derived from the motion vector difference of the other direction without encoding in the bidirectional prediction mode.

For example, a motion vector difference of a certain direction can be obtained by scaling directly the motion vector difference in the direction, and the scaling factor is related to the distance from the two reference pictures to the picture to which the current image block belongs.

In order to make the aforementioned objects, features and advantages of the embodiment of the present application more comprehensive, the technical solution in the embodiment of the present application is described in detail below in conjunction with the drawings.

It should be noted that the encoding and decoding method for prediction compensation adjustment described herein may be applied to an encoding device or a decoding side device. The image block described herein is an encoding block when the method is applied to an encoding side device; and is a decoding block when the method is applied to a decoding device.

Referring to FIG. 3, a schematic flowchart of an encoding and decoding method for prediction compensation adjustment according to an embodiment of the present application is shown, and as shown in FIG. 3, the encoding and decoding method for prediction compensation adjustment may include the following steps.

At step S300, prediction values of pixel points of a current image block are determined.

In the embodiment of the present application, the prediction value of each pixel point of the current image block may be determined based on the motion information of the current image block.

For example, the current image block may be divided into a plurality of sub-blocks, and the prediction value of each pixel point in each sub-block may be determined based on the sub-block.

For example, the sub-blocks may be 4*4 sub-blocks or 8*8 sub-blocks.

For example, an 8*8 image block may be divided into four 4*4 sub-blocks, and the prediction values of pixel points in each 4*4 sub-block are determined respectively.

For another example, a 16*16 image block may be divided into four 8*8 sub-blocks, and the prediction values of the pixel points in each 8*8 sub-block are determined respectively.

At step S310, gradient values of pixel points of the current image block is determined based on the prediction values of pixel points of the current image block.

At step S320, offset vectors of pixel points of the current image block are determined.

In the embodiment of the present application, for prediction compensation, on one hand, gradient values of pixel points of the current image block may be determined based on the prediction values of the pixel points of the current image block.

On the other hand, the offset vector of each pixel point of the current image block may be determined.

It should be noted that, in the embodiment of the present application, there is no temporal order for operations of determining gradient values of pixel points of the current image block and determining offset vectors of pixel points of the current image block. In other words, gradient values of pixel points of the current image block may be determined first and then the offset vectors of pixel points of the current image block are determined as shown in FIG. 3. Alternatively, the offset vectors of pixel points of the current image block may be determined first and then gradient values of pixel points of the current image block are determined. Alternatively, the gradient value and the offset vector of each pixel point of the current image block may be determined in parallel, and specific implementations thereof are not described herein repeatedly.

At step S330, prediction compensation values of pixel points of the current image block are determined based on the gradient values and the offset vectors of pixel points of the current image block.

In the embodiment of the present application, based on obtained gradient values and offset vectors of pixel points of the current image block are determined, prediction compensation values of pixel points of the current image block can be determined.

At step S340, final prediction values of pixel point of the current image block are determined based on the prediction values and the prediction compensation values of pixel points of the current image block.

In the embodiment of the present application, based on obtained prediction compensation values of pixel points of the current image block and prediction values, final prediction values of pixel points of the current image block can be determined.

In the method flow shown in FIG. 3, after prediction values of pixel points of the current image block are determined, prediction compensation values of pixel points of the current image block are determined based on gradient values and offset vectors of pixel points of the current image block. The final prediction values of pixel points of the current image block are determined based on prediction values and prediction compensation values of pixel points of the current image block. The prediction compensation adjustment is no longer limited to an image block using the bidirectional prediction mode, and is not limited to an image block for which the motion vector of each sub-block is the same as the motion vector of each pixel in the corresponding sub-block, which expands application scope of prediction compensation adjustment.

In the embodiment of the present application, the predication compensation adjustment is no longer limited to image blocks in bidirectional prediction mode. That is, the method is also applicable to image blocks in unidirectional prediction mode.

As a possible implementation, if the current image block uses the unidirectional prediction mode, determining the prediction value of each pixel point of the current image block in step S300 may include: determining unidirectional prediction values of pixel points of the current image.

In the step S310, determining gradient values of pixel points of the current image block based on the prediction values of pixel points of the current image block may include: determining gradient values of pixel points of the current image block in the direction based on the unidirectional prediction values of pixel points of the current image block.

In the step S320, determining offset vectors of pixel points of the current image block may include: determining offset vectors of pixel points of the current image block in the direction.

In the step S330, determining prediction compensation values of pixel points of the current image block based on the gradient values and the offset vectors of pixel points of the current image block may include: determining prediction compensation values of pixel points of the current image block in the direction based on the gradient values and offset vectors of pixel points of the current image block in the direction.

In the step S340, determining final prediction values of pixel points of the current image block based on the prediction values and the prediction compensation values of pixel points of the current image block may include: determining final prediction values of pixel points of the current image block in the direction based on the prediction values and prediction compensation values of pixel points of the current image block in the direction.

For example, in case where the current image block uses the unidirectional prediction mode, when the prediction value of a pixel point of the current image block is to be determined, the prediction value of the pixel point of the current image block in one direction may be determined.

For example, if the current image block uses a forward prediction mode, a forward prediction value of a pixel point of the current image block may be determined; if the current image block uses a backward prediction mode, a backward prediction value of the pixel point of the current image block may be determined.

For ease of description and understanding, an example of forward prediction mode is described below.

Forward prediction values of pixel points of the current image block have been determined. On one hand, forward gradient values of pixel points of the current image block may be determined based on the forward prediction values of pixel points of the current image block; on the other hand, forward offset vectors of pixel points of the current image block may be determined.

Furthermore, forward prediction compensation values of pixel points of the current image block may be determined based on forward gradient values and offset vectors of pixel points of the current image block, and forward final prediction values of pixel points of the current image block may be determined based on forward prediction values and prediction compensation values of pixel points of the current image block.

In another implementation, if the current image block uses the bidirectional prediction mode, the operation in S300 of determining prediction values of pixel points of a current image block may include: determining forward prediction values and backward prediction values of pixel points of the current image block respectively.

In the step S310, determining gradient values of pixel points of the current image block based on the prediction values of pixel points of the current image block may include: determining forward gradient values and backward gradient values of pixel points of the current image block based on the forward prediction values and the backward prediction values of pixel points of the current image block respectively.

In the step S320, determining offset vectors of pixel points of the current image block may include: determining forward offset vectors and backward offset vectors of pixel points of the current image block respectively.

In the step S330, determining prediction compensation values of pixel points of the current image block based on the gradient values and the offset vectors of pixel points of the current image block may include: determining forward prediction compensation values and backward prediction compensation values of pixel points of the current image block based on the forward gradient values, backward gradient values, forward offset vectors and backward offset vectors of pixel points of the current image block respectively.

In the step S340, determining final prediction values of pixel points of the current image block based on the prediction values and the prediction compensation values of pixel points of the current image block may include: determining forward final prediction values and backward final prediction values of pixel points of the current image block based on the forward prediction values, backward prediction values, forward prediction compensation values and backward prediction compensation value of pixel points of the current image block respectively; and determining final prediction values of pixel points of the current image block based on the forward final prediction values and backward final prediction values of pixel points of the current image block.

For example, in case that the current image block uses the bidirectional prediction mode, forward prediction values, backward prediction values, forward prediction compensation values and the backward prediction compensation values of pixel points of the current image block are determined respectively, so as to determine forward and backward final prediction values of pixel points of the current image block. Final prediction value of pixel points of the current image block are then determined.

For example, in case that the current image block uses a bidirectional prediction mode, forward final prediction values or backward final prediction values of pixel points of the current image block may be determined with reference to the determination of the current image block using the unidirectional prediction mode.

When forward final prediction values and backward final prediction values of pixel points of the current image block are determined, final prediction values of pixel points of the current image block may be determined based on the forward final predication values and the backward final prediction values of pixel points of the current image block.

For example, the forward final predication value and the backward final prediction value of each pixel point of the current image block are weighted to obtain the final prediction value of each pixel point of the current image block.

In one implementation, the operation in S320 wherein determining offset vectors of pixel points of the current image block may include:

for any sub-block of the current image block, determining an offset vector of a specified pixel point in the sub-block; and determining offset vectors of the other pixel points in the sub-block based on the offset vector of the specified pixel point in the sub-block.

For example, for any sub-block in the current image block, in order to determine offset vectors of pixel points in the sub-block, the offset vector of any pixel point (referred to as a specified pixel point herein) in the sub-block may be determined first, and then the offset vectors of other pixel points in the sub-block are determined based on the offset vector of the specified pixel point in the sub-block.

In an embodiment, for example, an Affine motion mode is applied to the current image block, determining the offset vector of the specified pixel point in the sub-block may include:

determining the offset vector of the specified pixel point in the sub-block based on Affine parameters and an offset of the specified pixel point from a center position of the sub-block.

For example, in the case where the current image block uses the Affine motion mode, the offset vector of the specified pixel point in the sub-block may be determined based on Affine parameters and the offset of the specified pixel point in the sub-block from the center position of the sub-block.

In an example, determining the offset vector of the specified pixel point in the sub-block based on Affine parameters and an offset of the specified pixel point from a center position of the sub-block may include:

determining a horizontal component of the offset vector of the specified pixel point in the sub-block based on an offset of the specified pixel point from the center position of the sub-block in the horizontal direction, an offset of the specified pixel point from the center position of the sub-block in the vertical direction, a first Affine parameter and a second Affine parameter; and determining a vertical component of the offset vector of the specified pixel point in the sub-block based on an offset of the specified pixel point from the center position of the sub-block in the horizontal direction, an offset of the specified pixel point from the center position of the sub-block in the vertical direction, a third Affine parameter and a fourth Affine parameter.

For example, for a 4-parameter Affine model, the first Affine parameter and the fourth Affine parameter are the same, either of which is a ratio of a first numerical value to the width of the sub-block, the second Affine parameter and the third Affine parameter are opposite, and the third Affine parameter is a ratio of a second numerical value to the width of the sub-block.

For a 6-parameter Affine model, the first Affine parameter is a ratio of the first numerical value to the width of the sub-block, the second Affine parameter is a ratio of a third numerical value to the height of the sub-block, the third Affine parameter is a ratio of the second numerical value to the width of the sub-block, and the fourth Affine parameter is a ratio of a fourth numerical value to the height of the sub-block.

The first numerical value is a difference between a horizontal component of a motion vector of an upper right control point of the sub-block and a horizontal component of a motion vector of an upper left control point of the sub-block, the second numerical value is a difference between a vertical component of the motion vector of the upper right control point of the sub-block and a vertical component of the motion vector of the upper left control point of the sub-block, the third numerical value is a difference between a horizontal component of the motion vector of a lower left control point of the sub-block and a horizontal component of the motion vector of the upper left control point of the sub-block, and the fourth numerical value is a difference between a vertical component of the motion vector of the lower left control point of the sub-block and a vertical component of the motion vector of the upper left control point of the sub-block.

Figure 4:
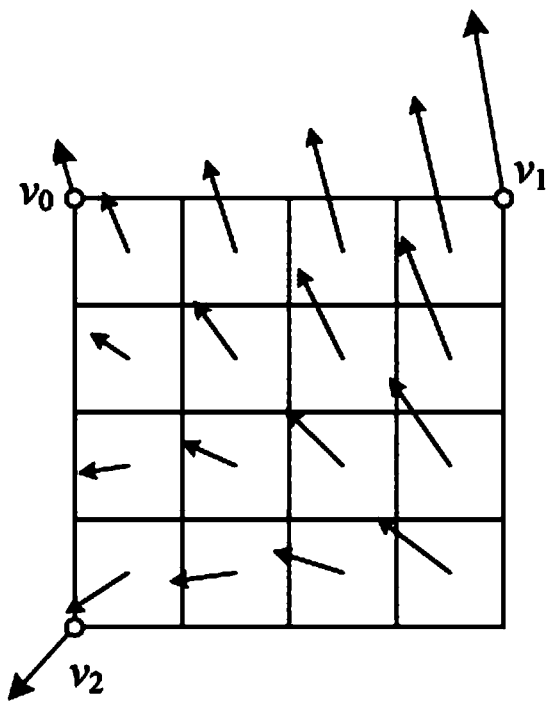
FIG. 4 is a schematic diagram of a motion vector of a control point of an Affine motion mode according to an exemplary embodiment of the present application.

For example, as shown in FIG. 4, the motion vectors of the upper left control point, the upper right control point and the lower left control point are $(v_{0x}, v_{0y})$, $(v_{1x}, v_{1y})$ and $(v_{2x}, v_{2y})$ respectively, the first numerical value is $v_{1x}-v_{0x}$, the second numerical value is $v_{1y}-v_{0y}$, the third numerical value is $x_{2x}-v_{0x}$, the fourth numerical value is $v_{2y}-v_{0y}$. The first Affine parameter to the fourth Affine parameter (c to f, for example) under the 4-parameter Affine model and the 6-parameter Affine model may be respectively shown in equations (1) and (2):

$$\begin{cases} c = f = \dfrac{v_{1x} - v_{0x}}{w} \\ e = -d = \dfrac{v_{1y} - v_{0y}}{w} \end{cases} \quad (1)$$

$$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases} \quad (2)$$

In an example, determination of the offset vector of the specified pixel point in the sub-block based on Affine parameters and an offset of the specified pixel point from a center position of the sub-block may be implemented by the following equation:

$$\begin{cases} \Delta v_x(x, y) = c * \Delta x + d * \Delta y \\ \Delta v_y(x, y) = e * \Delta x + f * \Delta y \end{cases} \quad (3)$$

For example, $\Delta v_x(x, y)$ is the horizontal component of the offset vector of the specified pixel point in the sub-block, $\Delta v_y(x, y)$ is the vertical component of the offset vector of the specified pixel point in the sub-block, and $(\Delta x, \Delta y)$ is the offset of the specified pixel point from the center position of the sub-block.

In an example, determining offset vectors of the other pixel points in the sub-block based on the offset vector of the specified pixel point in the sub-block comprises:
  determining horizontal components of offset vectors of other pixel points in the row of the specified pixel point in the sub-block based on the horizontal component of the offset vector of the specified pixel point in the sub-block and the first Affine parameter;
  determining vertical components of offset vectors of other pixel points in the row of the specified pixel point in the sub-block based on the vertical component of the offset vector of the specified pixel point in the sub-block and the third Affine parameter; and
  determining, for each pixel point in the row of the specified pixel point, horizontal components of offset vectors of other pixel points in the column of the pixel point in the sub-block based on the horizontal component of the offset vector of the pixel point and the second Affine parameter; and determining vertical components of offset vectors of other pixel points in the column of the pixel point in the sub-block based on the vertical component of the offset vector of the pixel point and the fourth Affine parameter.

For example, Affine motion mode is applied to the current image block. After the offset vector of the specified pixel point in the sub-block is determined, the offset vectors of other pixel points in the same row of the specified pixel point in the sub-block may be respectively determined based on the offset vector of the sub-block, the first Affine parameter, and the third Affine parameter.

When offset vectors of pixel points in the row of the specified pixel point the sub-block are determined, for any pixel point in the row of the specified pixel point in the sub-block, the offset vectors of other pixel points in the same column of the pixel point in the sub-block may be determined based on the offset vector of the pixel point, the second Affine parameter and the fourth Affine parameter.

For example, for any pixel point in the sub-block, the horizontal component of the offset vector of the pixel point may be a sum of a horizontal component of the offset vector of the left-adjacent pixel point of the pixel point (if exist) and the first Affine parameter, or the difference between a horizontal component of the offset vector of the right-adjacent pixel point of the pixel point (if exist) and the first Affine parameter. The vertical component of the offset vector of the pixel point may be a sum of a vertical component of the offset vector of the left-adjacent pixel point of the pixel point (if exist) and the third Affine parameter, or a difference between a vertical component of the offset vector of the right-adjacent pixel point of the pixel point (if exist) and the third Affine parameter.

In addition, for any pixel point in the sub-block, the horizontal component of the offset vector of the pixel point may be a sum of a horizontal component of the offset vector of the above-adjacent pixel point (if exist) and the second Affine parameter, or the difference between a horizontal component of the offset vector of the below-adjacent pixel point (if exist) and the second Affine parameter. The vertical component of the offset vector of the pixel point may be a sum of a vertical component of the offset vector of the above-adjacent pixel point (if exist) and the fourth Affine parameter, or a difference between a vertical component of the offset vector of the below-adjacent pixel point (if exist) and the fourth Affine parameter.

In one implementation, the operation in S310 of determining gradient values of pixel points of the current image block based on the prediction values of pixel points of the current image block comprises:

for each sub-block of the current image block, filling N row(s)/column(s) of integer pixel points on each of the top, bottom, left and right edges of the sub-block; wherein N is a positive integer; and determining gradient values of pixel points in the sub-block based on prediction values of pixel points and pixel values of the filled integer pixel points of the sub-block.

For example, in determination of the horizontal component of the gradient value of a pixel point, pixel values of adjacent pixel points at the left and right of the pixel are required, and in determination of the vertical component of the gradient value of the pixel point, pixel values of adjacent pixel point above and below the pixel point are required. However, for a pixel point at the edge of a sub-block, required pixels are missing on at least one side.

For example, for a pixel point on the top edge of the sub-block, there are no upper pixel points in the sub-block; and for pixel points on the left edge of the sub-block, there are no pixel points on the left in the sub-block.

Therefore, in order to determine gradient values of all pixel points in a sub-block, N (N is a positive integer) rows/columns of integer pixel points (pixels are integers) are respectively filled on each of the top, bottom, left and right edges of the sub-block. Gradient values of pixel points in the sub-block are determined based on prediction values of pixel points of the sub-block and pixel values of the filled integer pixel points.

For example, in order to reduce the increase of bandwidth, pixel values of the filled row/column of integer pixel points may be directly copied from near integer pixel points of the reference pixel.

As an embodiment, filling N row(s)/column(s) of integer pixel points on each of the top, bottom, left and right edges of the sub-block comprises:

determining, in a reference picture, an integer pixel block closest to and having the same size as the sub-block; and taking pixel values of N row(s)/column(s) of integer pixel points adjacent to the integer-pixel block as filling pixel values of the pixel points on the top, bottom, left and right edges of the sub block respectively.

For example, in order to fill N rows/columns of integer pixel points on the upper, lower, left, and right edges of the sub-block, an equal-sized integer-pixel block (a block formed by integer pixel points) closest to the sub-block may be determined first in a reference picture.

Figure 5A:
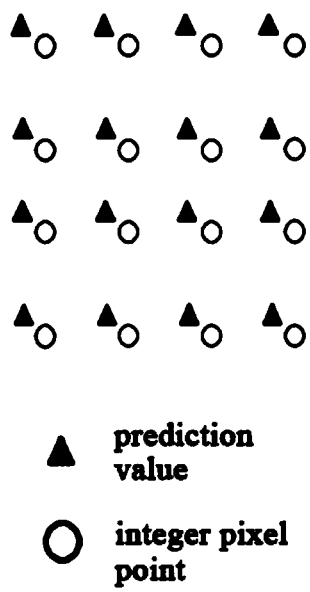
FIG. 5A is a schematic diagram of an integer-pixel block according to an exemplary embodiment of the present application.

For example, for a 4*4 sub-block, the closest 4*4 integer-pixel sub-block in the reference picture may be determined, as shown in FIG. 5A.

When the equal-sized integer-pixel block closest to the sub-block is determined in the reference picture, the pixel values of the adjacent N rows/columns of integer-pixels points around the integer-pixel block may be used as the filling values of pixel points on the top, bottom, left and right edges of the sub-block, respectively.

Figure 5B:
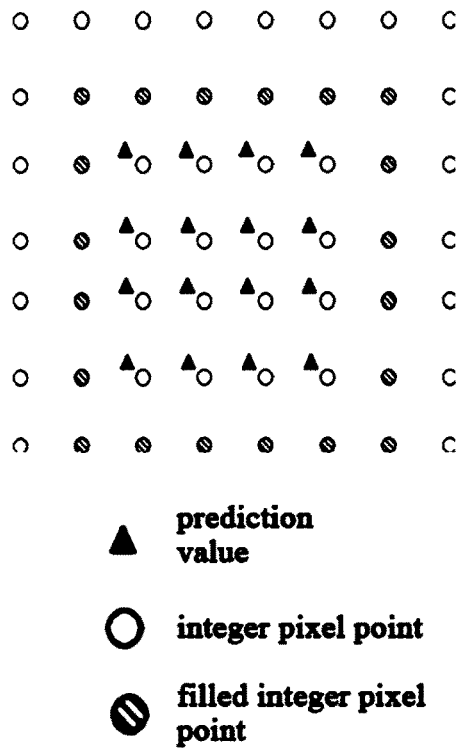
FIG. 5B is a schematic diagram of filling 1 row/column of integer pixel points according to an exemplary embodiment of the present application.
Figure 5C:
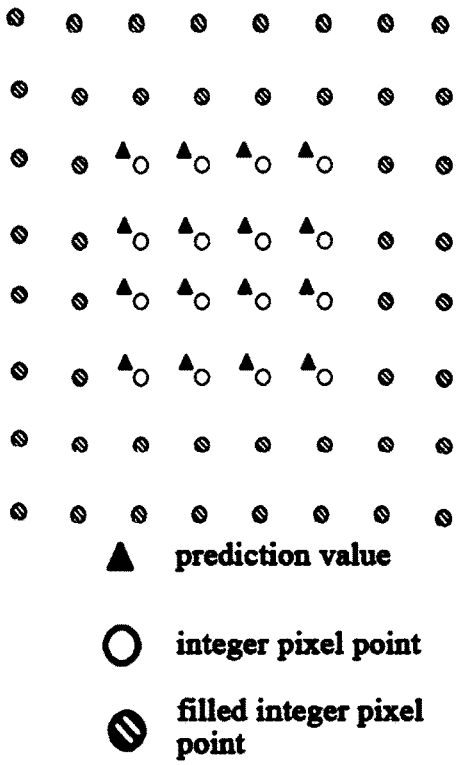
FIG. 5C is a schematic diagram of filling 2 rows/columns of integer pixel points according to an exemplary embodiment of the present application.

For example, filling points when N=1 and N=2 are as shown in FIGS. 5B and 5C, respectively.

In an example, filling N row(s)/column(s) of integer pixel points on each of the top, bottom, left, and right edges of the sub-block comprises:

filling respectively N row(s)/column(s) of integer pixel points that are exactly above, below, left to and right to the integer-pixel block respectively.

For example, a block with a width and a height increased by 2 N than the original block is obtained after N row(s)/column(s) of integer pixel points on the top, bottom, left and right edges of a sub-block are filled. the corner points of each layer of pixel points in N layers of pixel points outside the block will not be used when calculating the gradient value of each pixel point in the original block based on the pixel value of each pixel point in the block.

Therefore, in order to reduce the filling workload and improve the filling efficiency, when filling N row(s)/column(s) of integer pixel points on the top, bottom, left, and right edges of the sub-block, N rows/columns of integer pixel points exactly above, below, left to and right to the equal-sized closest integer-pixel block in the reference picture are filled.

Figure 5D:
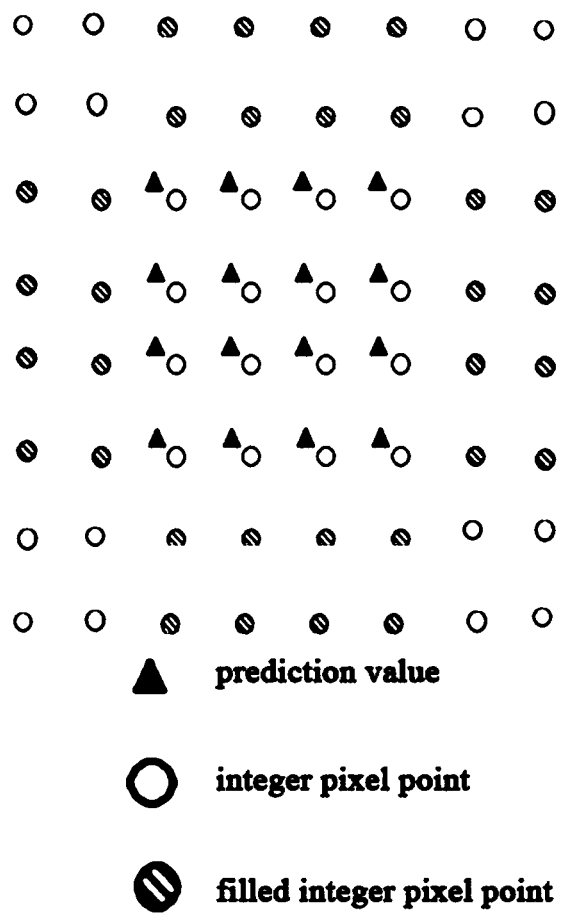
FIG. 5D is a schematic diagram of filling 2 rows/columns of integer pixel points according to another exemplary embodiment of the present application.

For example, N=2. The finally filled points are as shown in FIG. 5D.

In an embodiment, when N=1, filling respectively 1 row/column of integer pixels on the top, bottom, left and right edges of the sub-block comprises:

if a sub-pixel vertical component of a prediction value of a pixel point in the sub-block is greater than a half pixel, filling a nearest integer pixel point above the top edge of the sub-block, and filling a next nearest integer pixel point below the bottom edge of the sub-block;

if a sub-pixel vertical component of a prediction value of a pixel point in the sub-block is smaller than a half pixel, filling a next nearest integer pixel point above the top edge of the sub-block, and filling a nearest integer pixel point below the bottom edge of the sub-block;

if a sub-pixel horizontal component of a prediction value of a pixel point in the sub-block is greater than a half pixel, filling a nearest integer pixel point at the left of the left edge of the sub-block, and filling a next nearest integer pixel point at the right of the right edge of the sub-block; and if a sub-pixel horizontal component of a prediction value of a pixel point in the sub-block is smaller than a half pixel, filling a next nearest integer pixel point at the left of the left edge of the sub-block, and filling a nearest integer pixel point at the right of the right edge of the sub-block.

For example, in determining the horizontal component of the gradient value of a pixel point, pixel values of a pixel point at the left of the pixel point with a relative displacement of one pixel to the pixel point and a pixel value of the pixel point at the right of the pixel point with a relative displacement of one pixel to the pixel point. In addition, when filling pixel points is performed on a sub-block, the filled rows/columns are all integer pixel points. Therefore, when the prediction value of a pixel point in the sub-block is a non-integer pixel point, the relative displacement between the filled integer pixel point and the pixel point on the edge of the sub-block will not be one pixel (the relative displacement between the non-integer pixel point and the integer pixel point is a non-integer pixel).

In order to reduce the error of the determined gradient values of pixel points and improve the precision of the determined gradient values of pixel points, when 1 row/column of integer pixel points are to be filled on the top, bottom, left and right edges of the sub-block, the positions of the to-be-filled integer pixel points may be selected based on whether the vertical component and the horizontal component of the sub-pixel (namely, the part except the integer pixel, if the pixel value is 5.4, the sub-pixel is 0.4) of the prediction value of the pixel point in the sub-block are greater than a half pixel (namely, 0.5 pixel).

In an example, integer pixel points on the top and bottom edges are to be filled.

A vertical component of the sub-pixel of the prediction value of the pixel point in the sub-block may be obtained, and the vertical component of the sub-pixel is compared with the half-pixel.

For example, the sub-pixel of the prediction value of the pixel point in the sub-block refers to the sub-pixel of the corresponding position in the reference picture for the prediction value of the pixel point in the sub-block.

When the vertical component of the sub-pixel is greater than a half pixel, for any pixel point on the top edge of the sub-block, compared with other integer pixel points above the pixel point, the relative displacement between the nearest integer pixel point above the pixel point and the pixel point is closest to one pixel, and therefore the above nearest integer pixel point is filled for the pixel point.

And for any pixel point on the lower edge of the sub-block, compared with other integer pixel points below the pixel point, the relative displacement between the next-nearest integer pixel point below the pixel point and the pixel point is closest to one pixel.

For example, the vertical component of the sub-pixel of a pixel point on the bottom edge of the sub-block is 0.8, the relative displacement between the nearest integer pixel point below the pixel point and the pixel point is 0.2, the relative displacement between the next-nearest integer pixel point below the pixel point and the pixel point is 1.2, and the relative displacements between other integer pixel points below the pixel point and the pixel point are all greater than 1.2, it is obvious that the relative displacement between the next-nearest integer pixel point below the pixel point and the pixel point is closest to one pixel.

Therefore, the next-nearest integer pixel point below is filled for the pixel point.

Likewise, if a sub-pixel vertical component of a prediction value of a pixel point in the sub-block is smaller than a half pixel, filling a next nearest integer pixel point above the top edge of the sub-block, and filling a nearest integer pixel point below the bottom edge of the sub-block;

if a sub-pixel horizontal component of a prediction value of a pixel point in the sub-block is greater than a half pixel, filling a nearest integer pixel point at the left of the left edge of the sub-block, and filling a next nearest integer pixel point at the right of the right edge of the sub-block; and if a sub-pixel horizontal component of a prediction value of a pixel point in the sub-block is smaller than a half pixel, filling a next nearest integer pixel point at the left of the left edge of the sub-block, and filling a nearest integer pixel point at the right of the right edge of the sub-block.

It should be noted that, for the case that the horizontal component of the sub-pixel of the prediction value of the pixel point is equal to a half pixel, it may be processed according to the case where the horizontal component of the sub-pixel of the prediction value of the pixel point is greater than a half pixel, or according to the case where the horizontal component of the sub-pixel of the prediction value of the pixel point is smaller than a half pixel.

Likewise, for the case where the vertical component of the sub-pixel of the prediction value of the pixel point is equal to a half pixel, it may be processed according to the case where the vertical component of the sub-pixel of the prediction value of the pixel point is greater than a half pixel, or according to the case where the vertical component of the sub-pixel of the prediction value of the pixel point is smaller than a half pixel.

In an example, filling 1 row/column of integer pixel points on the top, bottom, left and right edges of the sub-block respectively includes:

filling the integer pixel points in a filling region formed by the to-be-filled rows/columns on the top, bottom, left and right edges of the sub-block except for 4 corner points of the filing region.

A block with width and height increased by 2 than the original block will be obtained after 1 row/column of integer pixel points are filled on the top, bottom, left and right edges of the sub-block. 4 corner points of the block will not be used when gradient values of pixel points in the original block are calculated based on pixel values of pixel points in the block.

For example, the original sub-block is 4*4 sub-block, a 6*6 block will be obtained after filling 1 row/column of integer pixel points on the top, bottom, left and right edges of the sub-block and 4 corner points of the 6*6 block will not be used when gradient values of pixel points in the original 4*4 block are calculated.

Therefore, in order to reduce the filling workload and improve the filling efficiency, when 1 row/column of integer pixel points are filled on the upper, lower, left and right edges of a sub-block respectively, the integer pixel points in a filling region formed by the rows/columns filled on the upper, lower, left and right edges of the sub-block may be filled except for 4 corner points of the filling region.

In an example, determining gradient values of pixel points in the sub-block based on prediction values of pixel points and pixel values of the filled integer pixel points of the sub-block may include:

determining, for each pixel point in the sub-block, a horizontal component of a gradient value of the pixel point based on pixel values of N adjacent pixel points at the left of the pixel point and pixel values of N adjacent pixel points at the right of the pixel point, and determining a vertical component of the gradient value of the pixel point based on pixel values of N adjacent pixel points above the pixel point and pixel values of N adjacent pixel points below the pixel point.

For example, for each pixel point in a sub-block, the horizontal component of the gradient value of the pixel point may be determined based on pixel values of pixel points at the left of the pixel point and pixel values of pixel points at the right of the pixel point, respectively, and the vertical component can be determined based on the pixel values of pixel points above the pixel point and pixel values of pixel points below the pixel point.

For a pixel point at the edge of the sub-block, pixel values of filled integer pixel points adjacent to the pixel point are required to determine the horizontal component or/and the vertical component of the gradient value of the pixel point.

For example, for a pixel point at the top edge of the sub-block, the pixel value of the above-adjacent filled integer pixel point of the pixel point (nearest integer pixel point or next-nearest integer pixel point) are required to determine the vertical component of the gradient value of the pixel point; for a pixel point at the left edge of the sub-block, the pixel value of the left adjacent filled integer pixel point of the pixel point is required to determine the horizontal component of the gradient value of the pixel point.

For example, N=1. For any pixel point in a sub-block, the gradient value of the pixel point may be determined by the following equation:

$$g_x(i,j)=I(i+1,j)-I(i-1,j) \quad (4)$$

$$g_y(i,j)=I(i,j+1)-I(i,j-1) \quad (5).$$

For example, $g_x(i, j)$ is the horizontal component of the gradient value of the pixel point in the i-th column and j-th row in the sub-block, $g_y(i, j)$ is the horizontal component of the gradient value of the pixel point in the i-th column and j-th row in the sub-block, $I(i, j)$ is the pixel value of the pixel point in the i-th column and j-th row in the sub-block.

It should be noted that, for the encoding device, the pixel value of a pixel point in a sub-block is a prediction value; the pixel value of a filled integer pixel point is an original value; for the decoding device, the pixel value of a pixel point in a sub-block is a prediction value; and the pixel value of a filled integer pixel point is a reconstruction value.

In order to ensure the effect of the prediction compensation adjustment solution according to the embodiment of the present application, and avoid using the solution in a case where the prediction compensation adjustment solution according to the embodiment of the present application is not applicable, a condition (referred to as an enabling condition for the prediction compensation adjustment herein) that allows the prediction compensation adjustment solution according to the embodiment of the present application to be used may be set in advance.

As a possible implementation,
before determining gradient values of pixel points of the current image block based on the prediction values of pixel points of the current image block, the method further comprises:
determining whether the current image block satisfies an enabling condition for prediction compensation adjustment; and
if the current image block satisfies the enabling condition for prediction compensation adjustment, performing the operation of determining gradient values of pixel points of the current image block based on the prediction values of pixel points of the current image block.

In an example, the enabling condition for the prediction compensation adjustment may include: a specified prediction mode is applied to the current image block, and in the specified prediction mode, a motion vector of a sub-block is not identical to a motion vector of any pixel point in the sub-block.

For example, it is impossible to perform the prediction compensation adjustment based on the existing prediction compensation adjustment solutions under a prediction mode (referred to as a specified prediction mode herein) in which a motion vector of a sub-block is not identical to a motion vector of any pixel point in a sub-block, therefore, the enabling condition for the prediction compensation adjustment may be set as: a specified prediction mode is applied to the current image block.

When prediction values of pixel points of the current image block are determined, whether the prediction compensation adjustment solution according to the embodiment of the present application is used may be determined based on the prediction mode of the current image block.

If the prediction compensation adjustment solution is used, that is, when the current image block uses the specified prediction mode, the prediction compensation adjustment is performed on the current image block according to the manner described in the above embodiment.

For example, the specified prediction mode includes an Affine motion mode.

In another example, the enabling condition for the prediction compensation adjustment may further include: a currently predicted component is a luminance component, that is, the prediction compensation adjustment is performed on the luminance component of the image block using the specified prediction mode according to the prediction compensation adjustment solution according to the embodiment of the present application.

In yet another example, the enabling condition for the prediction compensation adjustment may further include: the currently predicted component is a chrominance component, that is, the prediction compensation adjustment is performed on the chrominance component of the image block using the specified prediction mode according to the prediction compensation adjustment solution according to the embodiment of the present application.

For a better understanding of the technical solutions provided in the embodiments of the present application by those skilled in the art, the technical solutions provided in the embodiments of the present application are described below with reference to specific examples.

Embodiment 1

Figure 6:
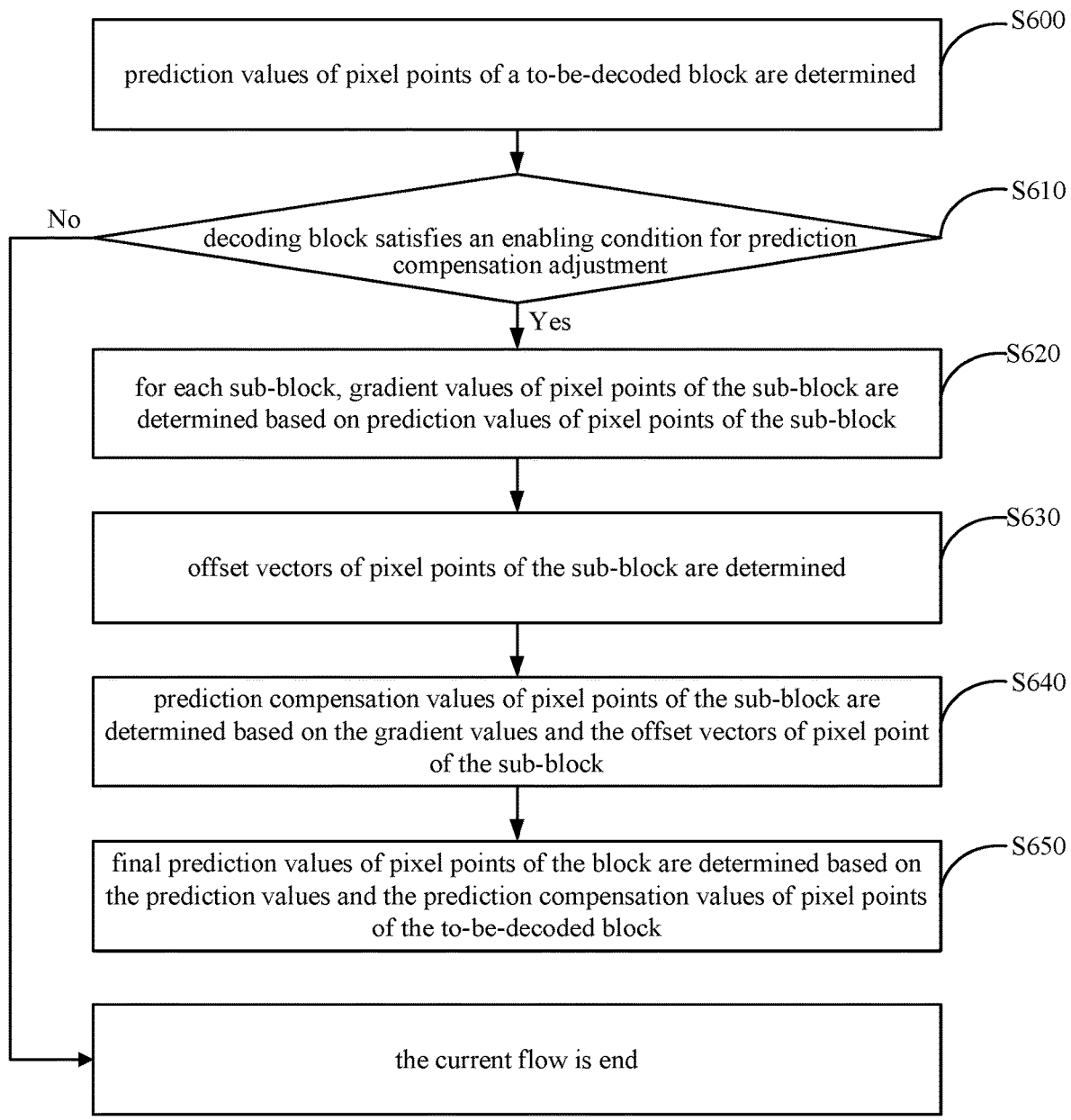
FIG. 6 is a schematic flowchart of an encoding and decoding method according to an exemplary embodiment of the present application.

Referring to FIG. 6, a schematic flowchart of an encoding and decoding method provided in an embodiment of the present application is shown, in context of a decoding process and an Affine mode. As shown in FIG. 6, the encoding and decoding method may include the followings.

At step S600, prediction values of pixel points of a to-be-decoded block are determined.

For example, the decoding block is divided into 4*4 sub-blocks, and each sub-block is decoded separately.

For any 4*4 sub-block, prediction values of pixel points in the sub-block may be determined based on the Affine mode.

For example, for a pixel point with coordinates (i, j) in a sub-block, its pixel value is denoted as I (i, j).

At step S610: a determination is made as to whether the decoding block satisfies an enabling condition for prediction compensation adjustment, if the decoding block satisfies the condition for prediction compensation adjustment, the flow proceeds to step S620; otherwise, the current process is ended.

For example, after prediction values of pixel points of the to-be-decoded block is determined, a determination is made to whether the block satisfies the enabling condition for prediction compensation adjustment.

If it is determined that the to-be-decoded block does not satisfy the enabling condition for prediction compensation adjustment, the prediction compensation adjustment is not to be performed according to the prediction compensation adjustment solution provided in the embodiment of the present application. In this case, prediction values of pixel points of the block determined in step S600 may be determined as final prediction values of pixel points. Alternatively, the prediction compensation adjustment solution may be performed according to other strategies, and the specific implementation thereof is not limited.

At step S620, for each sub-block, gradient values of pixel points of the sub-block are determined based on prediction values of pixel points of the sub-block.

At step S630, offset vectors of pixel points of the sub-block are determined.

For example, when it is determined that the to-be-decoded block satisfies the enabling condition for prediction compensation adjustment, for any 4*4 sub-block, on one hand, gradient values of pixel points of the 4*4 sub-block may be determined based on the prediction values of pixel points of the 4*4 sub-block.

On the other hand, offset vectors of pixel points of the 4*4 sub-block may be determined.

At step S640, prediction compensation values of pixel points of the sub-block are determined based on the gradient values and the offset vectors of pixel point of the sub-block.

For example, for the 4*4 sub-block, when gradient values and offset vectors of pixel points of the 4*4 sub-block are determined, prediction compensation values of pixel points of the 4*4 sub-block may be determined based on the gradient values and the offset vectors of pixel points of the 4*4 sub-block.

At step S650, final prediction values of pixel points of the block are determined based on the prediction values and the prediction compensation values of pixel points of the to-be-decoded block.

For example, if a unidirectional prediction mode is utilized, unidirectional prediction values and prediction compensation values of pixel points of the to-be-decoded block in the direction may be determined as described in the steps S600 to S640. Then final prediction values of pixel points of the to-be-decoded block are obtained.

If a bidirectional prediction mode is utilized, forward prediction values, backward prediction values, forward prediction compensation values and backward prediction compensation values of pixel points of the to-be-decoded block may be determined as described in the steps S600 to S640, and then final prediction values of pixel points of the to-be-decoded block are obtained.

Embodiment 2

In an example, the enabling condition for the encoding and decoding method flow described in the steps S600 to S650 may include:
an Affine motion mode is applied to the current image block.

Embodiment 3

In an example, the enabling condition for the encoding and decoding method flow described in the steps S600 to S650 may include:
an Affine motion mode is applied to the current image block; and
the currently predicted component is a luminance component.

Embodiment 4

In an example, the enabling condition for the encoding and decoding method flow described in the steps S600 to S650 may include:
an Affine motion mode is applied to the current image block; and
the currently predicted component is a chrominance component.

Embodiment 5

In an example, on the basis of any one of the foregoing embodiments, determining gradient values of pixel points of the sub-block in step S620 may include the followings.

1. 1 row/column of integer pixel points are filled on the top edge, the bottom edge, the left edge and the right edge of a 4*4 block respectively to obtain a corresponding 6*6 block.

For example, pixel values of the integer pixel points filled on the top, bottom, left and right edges of the 4*4 block may be derived from reconstructed values of adjacent integer pixel points in a reference picture.

2. Gradient values of pixel points in the 4*4 sub-block are calculated based on pixel values of pixel points in the 6*6 block.

For example, for each pixel point in the 4*4 sub-block, the gradient value of the pixel point may be determined based on equations 4 and 5 (the horizontal component of the gradient value of the pixel point may be described as mm_gradx, and the vertical component of the gradient value of the pixel point may be described as mm_grady).

Embodiment 6

For example, on the basis of the embodiment 5, 1 row/column of integer pixel points are filled on the top, bottom, left and right edges of the 4*4 sub-block respectively, which may include the following implementations.

As an example, integer pixel points filled on the top, bottom, left, and right edges of the 4*4 sub-block may be selected based on whether the horizontal component and the vertical component of the sub-pixel of the prediction value of a pixel point in the 4*4 sub-block are greater than a half pixel.

Figure 7A:
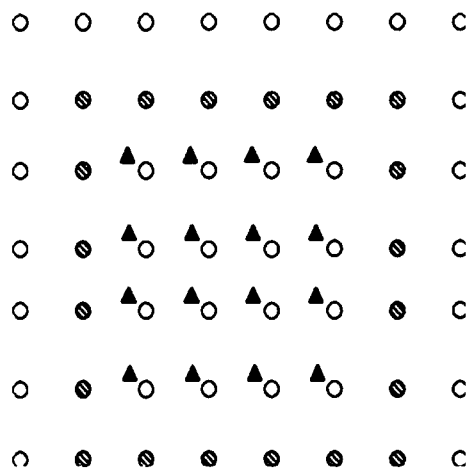
FIGS. 7A-7E are schematic diagrams of filling 1 row/column of integer pixel points according to exemplary embodiments of the present application.

Referring to FIG. 7A, in case that both the horizontal component and the vertical component of a sub-pixel of the prediction value of the pixel point are greater than a half pixel, a nearest integer pixel point above the top edge of the 4*4 sub-block is filled, a next-nearest integer pixel point below the bottom edge of the 4*4 sub-block is filled, a nearest integer pixel point at the left of the left edge of the 4*4 sub-block is filled, and a next-nearest integer pixel point at the right of the right edge of the 4*4 sub-block is filled.

Figure 7B:
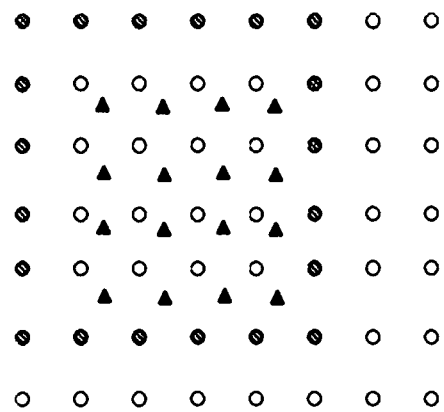

Referring to FIG. 7B, in case that both the horizontal component and the vertical component of a sub-pixel of the prediction value of the pixel point are smaller than a half pixel, a next-nearest integer pixel point above the top edge of the 4*4 sub-block is filled, a nearest integer pixel point below the bottom edge of the 4*4 sub-block is filled, a next nearest integer pixel point at the left of the left edge of the 4*4 sub-block is filled, and a next-nearest integer pixel point at the right of the right edge of the 4*4 sub-block is filled.

Figure 7C:
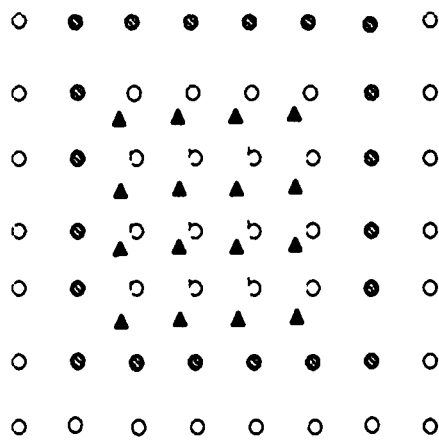

Referring to FIG. 7C, in case that a sub-pixel horizontal component of a prediction value of a pixel point is greater than a half pixel but a sub-pixel vertical component of the prediction value of the pixel point is smaller than a half pixel, a next-nearest integer pixel point above the top edge of the 4*4 sub-block is filled, a nearest integer pixel point below the bottom edge of the 4*4 sub-block is filled, a nearest integer pixel point at the left of the left edge of the 4*4 sub-block is filled, and a next-nearest integer pixel point at the right of the right edge of the 4*4 sub-block is filled.

Figure 7D:
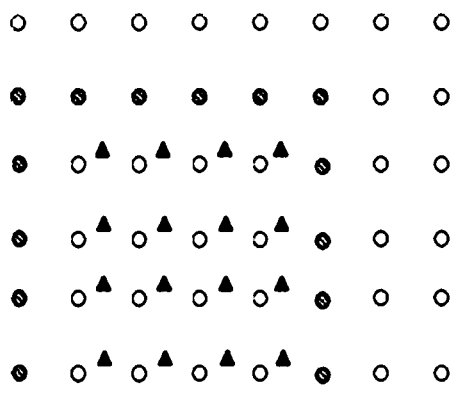

Referring to FIG. 7D, in case that a sub-pixel horizontal component of a prediction value of a pixel point is smaller than a half pixel but a sub-pixel vertical component of the prediction value of the pixel point is larger than a half pixel, a next-nearest integer pixel point above the top edge of the 4*4 sub-block is filled, a next-nearest integer pixel point below the bottom edge of the 4*4 sub-block is filled, a next-nearest integer pixel point at the left of the left edge of the 4*4 sub-block is filled, and a nearest integer pixel point at the right of the right edge of the 4*4 sub-block is filled.

For example, in FIG. 7A to 7D, a triangle is a prediction value of a pixel point of a 4*4 sub-block, a circle is a reconstructed value of an integer pixel point in a reference picture, and a shaded circle is a reconstructed value of an integer pixel point in the reference picture selected for filling.

It should be noted that, in case that the horizontal component of the sub-pixel of the prediction value of the pixel point is equal to a half pixel, the filling process may be performed according to the case where the horizontal component of the sub-pixel of the prediction value of the pixel point is greater than a half pixel, or according to the case where the horizontal component of the sub-pixel of the prediction value of the pixel point is smaller than a half pixel.

Likewise, in case where the vertical component of the sub-pixel of the prediction value of the pixel point is equal to a half pixel, the filling process may be performed according to the case where the vertical component of the sub-pixel of the prediction value of the pixel point is greater than a half pixel, or according to the case where the vertical component of the sub-pixel of the prediction value of the pixel point is smaller than a half pixel.

Embodiment 7

As an example, on the basis of the embodiment 6, since the pixel values of the four corner points of the filling region will not be used, when 1 row/column of integer pixel points on the top, bottom, left and right edges of the 4*4 sub-block are filled, the 4 corner points may not be filled. 4 points on each of top, bottom, left and right edges may be filled respectively.

Figure 7E:
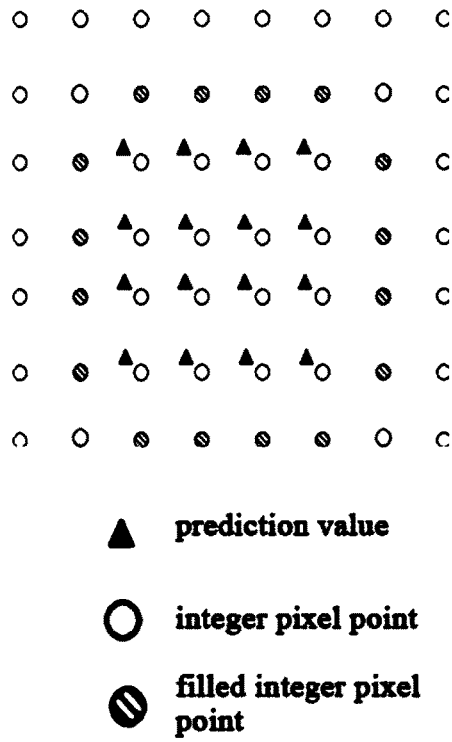

FIG. 7E is a schematic diagram showing a block with 1 row/column on top, bottom, left and right edges of the 4*4 sub-block are filled in case of both the horizontal component and the vertical component of the sub-pixel of the prediction value of the pixel point being greater than a half pixel.

Above process applies to other cases.

Embodiment 8

In an example, on the basis of any one of the foregoing embodiments, in the step S630, determining offset vectors of pixel points of the sub-block may include:

1. Affine parameters c (i.e., a first Affine parameter), d (i.e., a second Affine parameter), e (i.e., a third Affine parameter), and f (i.e., a fourth Affine parameter) are calculated.

For example, the Affine parameters c, d, e, and f may be determined by equations 1 and 2.

2. An offset vector of a first pixel point in the 4*4 sub-block is determined based on the Affine parameters c, d, e and f and an offset of the first pixel point in the 4*4 sub-block from the center position of the 4*4 sub-block.

For example, the specified pixel point is the first pixel point.

The offset ($\Delta x$, $\Delta y$) of the first pixel point in the 4*4 sub-block from the center position of the 4*4 sub-block may be determined based on the coordinates of the first pixel point in the 4*4 sub-block and the coordinates of the center position of the 4*4 sub-block.

The offset vector of the first pixel point of the 4*4 sub-block may be determined by the following equation:

$$\begin{cases} \Delta v_x(0, 0) = c*\Delta x + d*\Delta y \\ \Delta v_y(0, 0) = e*\Delta x + f*\Delta y \end{cases} \quad (6)$$

3. Offset vectors of other pixel points in the 4*4 sub-block are determined based on the offset vectors of the first pixel point in the 4*4 sub-block.

After the offset vector of the first pixel point in the 4*4 sub-block is determined based on equation 6, the offset vectors of other pixel points in the first row of the 4*4 sub-block may be determined by the following equation:

$$\begin{cases} \Delta v_x(w, 0) = \Delta v_x(w-1, 0) + c \\ \Delta v_y(w, 0) = \Delta v_y(w-1, 0) + e \end{cases} \quad (7)$$

$\Delta v_x(w, 0)$ is the horizontal component of the offset vector of the pixel point in the w+1 column and 1st row in the 4*4 sub-block, $\Delta v_y(w, 0)$ is the vertical component of the offset vector of the pixel point in the w+1 column and 1st row in the 4*4 sub-block, and $1 \leq w \leq 3$. After the offset vectors of pixel points in the first row in the 4*4 sub-block are determined based on equation 7, the offset vectors of other pixel points in the 4*4 sub-block may be determined by the following equation:

$$\begin{cases} \Delta v_x(w, h) = \Delta v_x(w, h-1) + d \\ \Delta v_y(w, h) = \Delta v_y(w, h-1) + f \end{cases} \quad (8)$$

$\Delta v_x(w, h)$ is the horizontal component of the offset vector of the pixel point in the w+1 column and h+1 row in the 4*4 sub-block, $\Delta v_y(w, h)$ is the vertical component of the offset vector of the pixel point in the w+1 column and h+1 row in the 4*4 sub-block, and $1 \leq h \leq 3$.

It should be noted that, since the Affine mode parameters and pixel points at the same position in each sub-block have the same offset from the center position of the sub-block, after offset vectors of pixel points in one sub-block are calculated, the offset vectors of pixel points in the sub-block may be reused by other sub-blocks in the decoding block.

Embodiment 9

In an example, on the basis of the embodiment 8, a "left shift and then right shift" may be used instead of division in calculating the Affine parameters c, d, e and f in order to ensure the precision and improve the hardware friendliness.

For c and e, they may be left shifted by (MAX_CU_DEPTH-Log 2[width]) bits first and then right shifted by MAX_CU_DEPTH bits; for d and f in the 6-parameter model, they may be left shifted by (MAX_CU_DEPTH-Log 2[height]) bits and then right shifted by MAX_CU_DEPTH bits.

For example, width is the width of the current image block, height is the height of the current image block, and MAX_CU_DEPTH is the depth of the width or height of the largest image block, which is 7 by default (i.e., the width or height of the corresponding image block is 128).

In an example, MAX_CU_DEPTH=7, then c, d, e, and f may be determined by the following equations respectively:

$$c = (v_{1x} - v_{0x}) << (7 - \text{Log } 2[\text{width}]) \quad (9)$$

$$e = (v_{1y} - v_{0y}) << (7 - \text{Log } 2[\text{width}]) \quad (10).$$

For the 6-parameter model:

$$d=(v_{2x}-v_{0x})<<(7-\text{Log }2[\text{height}]) \quad (11)$$

$$f=(v_{2y}-v_{0y})<<(7-\text{Log }2[\text{height}]), \quad (12)$$

for example, << denotes a left shift.
For the 4-parameter model: d=−e; f=c.

Embodiment 10

In an example, in order to improve the precision of offset vectors, on the basis of any one of the foregoing embodiments, offset vectors of pixel points of the 4*4 sub-block may be magnified in determination thereof.

For example, in the process of calculating offset vectors, the offset vectors of pixel points in the 4*4 sub-block may be multiplied by N1 (N1 is a positive integer, such as 4 or 8), and further, the offset vector of the first pixel point in the 4*4 sub-block may be determined by the following equation:

$$\begin{cases} \Delta v_x(0,0) = N1*c*\Delta x + N1*d*\Delta y \\ \Delta v_y(0,0) = N1*e*\Delta x + N1*f*\Delta y \end{cases} \quad (13)$$

After the offset vector of the first pixel point in the 4*4 sub-block is determined based on the equation 13, offset vectors of other pixel points in the first row in the 4*4 sub-block may be determined by the following equation:

$$\begin{cases} \Delta v_x(w,0) = \Delta v_x(w-1,0) + N1*c \\ \Delta v_y(w,0) = \Delta v_y(w-1,0) + N1*e \end{cases} \quad (14)$$

After the offset vectors of the pixel points in the first row of the 4*4 sub-block are determined based on the equation 14, the offset vectors of other pixel points in the 4*4 sub-block may be determined by the following equation:

$$\begin{cases} \Delta v_x(w,h) = \Delta v_x(w,h-1) + N1*d \\ \Delta v_y(w,h) = \Delta v_y(w,h-1) + N1*f \end{cases} \quad (15)$$

After N1 times magnified offset vectors of pixel points of the 4*4 sub-block are determined based on the equations 13 to 15, offset vectors of pixel points, which are magnified by N1 times, may be reduced by N2 times.

For example, N2 may be the same as N1 or may be different from N1.

For example, N1 is 4, then N2 may be 4, or N2 may be 2 (i.e., the finally determined offset vector is an offset vector magnified by 2 times).

In an example, a determined offset vector may be reduced by the following equation:

$$n\text{Offset}=1<<(\text{MAX\_CU\_DEPTH}-1) \quad (16)$$

$$mvx=(mvx+n\text{Offset}-(mvx>=0))>>\text{MAX\_CU\_DEPTH} \quad (17)$$

$$mvy=(mvy+n\text{Offset}-(mvy>=0))>>\text{MAX\_CU\_DEPTH} \quad (18)$$

For example, mvx is a horizontal component of an offset vector of a pixel point, mvy is a vertical component of the offset vector of the pixel point, >> represents a right shift, << represents a left shift, mvx>=0 means that if mvx is greater than or equal to 0, then mvx=1, otherwise, mvx=0; mvy>=0 means that if mvy is greater than or equal to 0, then mvy=1, otherwise, mvy=0.

For example, mvx and mvy are limited in a range [−(1<<bdlimit), (1<<bdlimit)−1]; and bdlimit is empirically set.

In an example, bdlimit=max (6, bitdepth-6), bitdpth is the bit depth, i.e., a required bit width of the luminance value, typically 10 or 8.

In another example, bdlimit=max (5, bitdepth-7).

Embodiment 11

In an example, on the basis of any one of the embodiment 8 to embodiment 10, it is assumed that the offset of the first pixel in the 4*4 sub-block from the center position of the 4*4 sub-block is (−1.5, −1.5), then $\Delta v_x(0,0)=-1.5c-1.5d$, $\Delta v_y(0,0)=-1.5e-1.5f$, and the 4 times magnified horizontal component and the vertical component of the offset vector are respectively: $\Delta v_x(0,0)=-6c-6d$, $\Delta v_y(0,0)=-6e-6f$.

Embodiment 12

In an example, on the basis of any one of the embodiment 8 to embodiment 10, it is assumed that the offset of the first pixel in the 4*4 sub-block from the center position of the 4*4 sub-block is (−2, −2), then $\Delta v_x(0,0)=-2c-2d$, $\Delta v_y(0,0)=-2e-2f$, and the 4 times magnified horizontal component and the vertical component of the offset vector are respectively: $\Delta v_x(0,0)=-8c-8d$, $\Delta v_y(0,0)=-8e-8f$.

Embodiment 13

In an example, on the basis of any one of the embodiment 1 to embodiment 7, the offset vector of a pixel point in the sub-block may be determined by the following equations:

$$\Delta v_x(w,h)=w*N3c+w*N3d-\text{posOffset}X \quad (19)$$

$$\Delta v_y(w,h)=w*N3e+w*N3f-\text{posOffset}Y \quad (20)$$

For example, N3 is the magnification of the offset vector, e.g., 4; posOffsetX=N4*c+N4d, posOffsetY=N4*e+N4*f and N4 is 6 or 8.

Embodiment 14

In an example, on the basis of any one of the foregoing embodiments, determining prediction compensation values of pixel points of the sub-block based on gradient values and offset vectors of pixel points of the sub-block may be implemented by the following equation:

$$\Delta I(i,j)=g_x(i,j)*\Delta v_x(i,j)+g_y(i,j)*\Delta v_y(i,j) \quad (21).$$

For example, $\Delta I(i, j)$ is a prediction compensation value of a pixel point in the ith column and the jth row in a sub-block, $g_x(i, j)$ is a horizontal component of a gradient value of the pixel point in the ith column and the jth row in the sub-block, $g_y(i, j)$ is a vertical component of the gradient value of the pixel point in the ith column and the jth row in the sub-block, $\Delta v_x(i, j)$ is a horizontal component of an offset vector of a pixel point in the ith column and the jth row in the sub-block, and $\Delta v_y(i, j)$ is a vertical component of the offset vector of the pixel point in the ith column and the jth row in the sub-block.

Embodiment 15

In an example, on the basis of any one of the foregoing embodiments, if the decoding block uses a unidirectional prediction mode, the unidirectional (forward or backward) prediction compensation adjustment may be implemented by the following equations:

$$mm\_dI1 = mvx * mm\_gradx + mvy * mm\_grady \quad (22)$$

$$mm\_dI2 = (mm\_dI1 + 1) >> 1 \quad (23)$$

$$mm\_dI3 = (mm\_src + mm\_dI2) * mm\_w \quad (24).$$

For example, mm_dI2 is a unidirectional prediction compensation value of a pixel point, mm_dI3 is a final prediction value of the pixel point in the direction, mvx is a horizontal component of an offset vector of the pixel point in the direction, mvy is a vertical component of the offset vector of the pixel point in the direction, mm_gradx is a horizontal component of a gradient value of the pixel point in the direction, mm_grady is a vertical component of the gradient value of the pixel point in the direction, mm_src is a prediction value of the pixel point in the direction, and mm_w is a weight value of the pixel point in the direction, mm_w is 1 in the unidirectional prediction mode.

Embodiment 16

In an example, on the basis of any one of the foregoing embodiments, if the to-be-decoded block uses a bidirectional prediction mode, a forward prediction compensation adjustment and a backward prediction compensation adjustment are respectively implemented, and then the prediction compensation adjustment of the block is implemented.

For example, the forward prediction compensation adjustment may be implemented by the following equations:

$$mm\_dI01 = mvx0 * mm\_gradx0 + mvy0 * mm\_grady0 \quad (25)$$

$$mm\_dI02 = (mm\_dI01 + 1) >> 1 \quad (26)$$

$$mm\_dI03 = (mm\_src0 + mm\_dI02) * mm\_w0 \quad (27)$$

For example, mm_dI02 is a forward prediction compensation value of a pixel point, mm_dI03 is a forward final prediction value of the pixel point, mvx0 is a horizontal component of a forward offset vector of the pixel point, myy0 is a vertical component of the forward offset vector of the pixel point, mm_gradx0 is a horizontal component of a forward gradient value of the pixel point, mm_grady0 is a vertical component of the forward gradient value of the pixel point, mm_src0 is a forward prediction value of the pixel point, and mm_w0 is a forward weight value of the pixel point.

For example, the backward prediction compensation adjustment may be implemented by the following equations:

$$mm\_dI11 = mvx1 * mm\_gradx1 + mvy1 * mm\_grady1 \quad (28)$$

$$mm\_dI12 = (mm\_dI11 + 1) >> 1 \quad (29)$$

$$mm\_dI13 = (mm\_src1 + mm\_dI12) * mm\_w1 \quad (30).$$

For example, mm_dI12 is a backward prediction compensation value of a pixel point, mm_dI13 is a backward final prediction value of the pixel point, mvx1 is a backward horizontal component of the offset vector of the pixel point, mvy1 is a backward vertical component of the offset vector of the pixel point, mm_gradx1 is a backward horizontal component of the gradient value of the pixel point, mm_grady1 is a backward vertical component of the gradient value of the pixel point, mm_src1 is a backward prediction value of the pixel point, and mm_w1 is a backward weight value of the pixel point.

The weighting process (dividing the sum of the forward final prediction value and the backward final prediction value by the sum of the forward weight value and the backward weight value) is completed based on forward final prediction values and backward final prediction values of pixel points of the to-be-decoded block to obtain final prediction values of pixel points of the to-be-decoded block.

Embodiment 17

Figure 8:
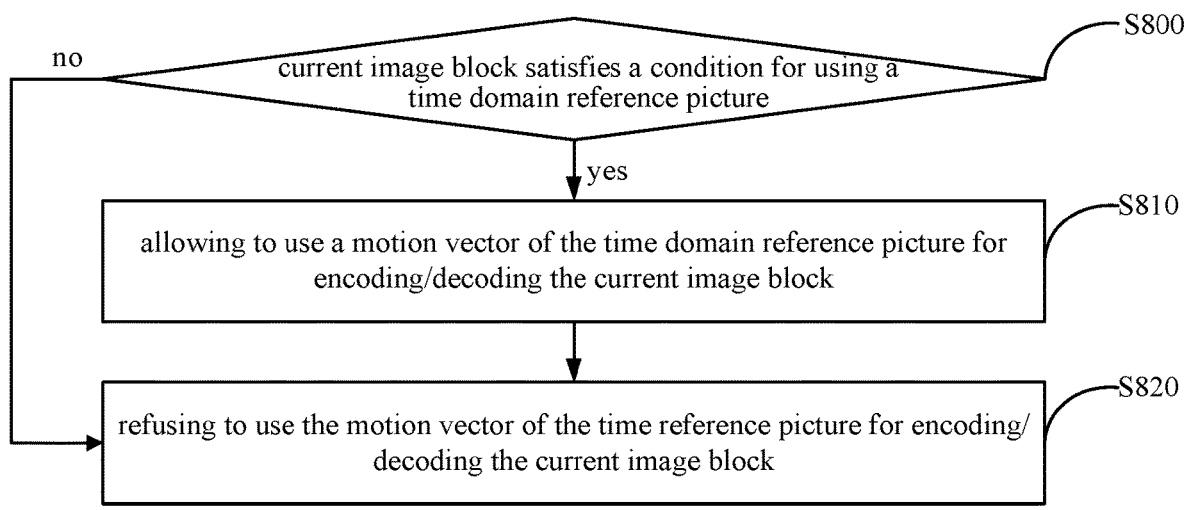
FIG. 8 is a schematic flowchart of a method for selecting candidate motion vectors according to an exemplary embodiment of the present application.

Referring to FIG. 8, a schematic flowchart of a candidate motion vector selection method provided in an embodiment of the present application is shown. As shown in FIG. 8, the candidate motion vector selection method may include the following steps:

Step S800: determining whether the current image block satisfies a condition for using a time domain reference picture. If the condition is satisfied, the method proceeds to step S810; or otherwise, the method proceeds to step S820.

Step S810: allowing to use a motion vector of the time domain reference picture for encoding/decoding the current image block; and Step S820: refusing to use the motion vector of the time reference picture for encoding/decoding the current image block.

In some cases, the probability of the motion vector of the time domain reference picture being finally selected is low. In order to improve the encoding and decoding performance, and avoid improper use of the motion vector of the time domain reference picture as a candidate motion vector, a condition (referred to as a condition for using the time domain reference picture herein) for allowing the use of the motion vector of the time domain reference picture may be set in advance.

Accordingly, when the current image block is encoded/decoded, whether the current image block satisfies the condition for using the time domain reference picture may be determined, i.e., the motion vector of the time domain reference picture is allowed to be used for encoding/decoding the current image block, or the motion vector of the time domain reference picture is not to be used for encoding/decoding the current image block.

In an example, the condition for using the time domain reference picture may include:

the size of the reference picture is the same as the size of a picture to which the current image block belongs.

For example, the probability of the motion vector of the time domain reference picture being finally selected is low when the size of the reference picture is different from the size of the picture to which the current image block belongs. Therefore, in order to improve the encoding and decoding performance, the condition for using the time domain reference picture is the size of the reference picture being the same as the size of the picture to which the current image block belongs. That is, when the size of the reference picture is the same as the size of the picture to which the current image block belongs, the motion vector of the time domain reference picture is allowed to be used for encoding/decoding the current image block; and when the size of the reference picture is different from the size of the picture to which the current image block belongs, the motion vector of the time domain reference picture is not to be used for encoding/decoding the current image block.

In another example, the condition for using the time domain reference picture may further include:

the reference picture is not a long-term reference picture (i.e. Long-Term Reference Picture, abbreviated as LTRP).

For example, the long-term reference picture is relative to a reference picture that is closer to the picture to which the current image block belongs, and in general, the long-term reference picture is further from the picture to which the current image block belongs.

For example, the probability that the motion vector of the time domain reference picture is finally selected is lower when the size of the reference picture is the same as the size of the picture to which the current image block belongs but the reference picture is a long-term reference picture, therefore, the reference picture being not a long-term reference picture may be used as a condition for using the time domain reference picture. That is, when the size of the reference picture is the same as the size of the picture to which the current image block belongs and the reference picture is not a long-term reference picture, the motion vector of the time domain reference picture is allowed to be used for encoding/decoding the current image block; and when the size of the reference picture is different from the size of the picture to which the current image block belongs and/or the reference picture is a long-term reference picture, the motion vector of the time domain reference picture is not allowed to be used for encoding/decoding the current image block.

In a possible embodiment, after allowing to use the motion vector of the time domain reference picture for encoding/decoding the current image block, it may further include:
  determining whether the current image block satisfies a condition for scaling the motion vector of the time domain reference picture;
  if the current image block satisfies the condition for scaling the motion vector of the time domain reference picture, allowing to scale the motion vector of the time domain reference picture to encoding/decoding the current image block; and
  if the current image block doesn't satisfy the condition for scaling and using the motion vector of the time domain reference picture, refusing to scale the motion vector of the time domain reference picture to encoding/decoding the current image block.

For example, in consideration of a low probability that the scaled motion vector of the time domain reference picture is finally selected in some specific situations, therefore, in order to improve the encoding and decoding performance, and avoid using the scaled motion vector of the time domain reference picture as a candidate motion vector under a condition that the scaled motion vector of the time domain reference picture is not applicable, a condition (referred to as the condition for scaling and using the motion vector of the time domain reference picture herein) whether to allow to use the scaled motion vector of the time domain reference picture may be set in advance.

In an example, the condition for scaling the motion vector of the time domain reference picture may include:
  the size of the reference picture is the same as the size of a picture to which the current image block belongs, and the reference picture is not a long-term reference picture.

For example, the probability of the scaled motion vector of the time domain reference picture being finally selected is low when the size of the reference picture is different from the size of the picture to which the current image block belongs, and/or the reference picture is a long-term reference picture. Therefore, the size of the reference picture being the same as the size of the picture to which the current image block belongs and the reference picture being not a long-term reference picture is used as the condition for scaling the motion vector of the time domain reference picture.

When the size of the reference picture is the same as the size of the picture to which the current image block belongs and the reference picture is not a long-term reference picture, the scaled motion vector of the time domain reference picture is allowed to be used for encoding/decoding the current image block; and when the size of the reference picture is different from the size of the picture to which the current image block belongs and/or the reference picture is a long-term reference picture, the scaled motion vector of the time domain reference picture is not allowed to be used for encoding/decoding the current image block.

In a possible implementation, after determining whether the current image block satisfies the condition for using the time domain reference picture, the method further includes:
  determining that a first type of prediction mode is allowed to be used when the condition for using the time domain reference picture is satisfied; and
  determining that the first type of prediction mode and a second type of prediction mode are not allowed to be used when the condition for using the time domain reference picture is not satisfied.

In an example, the first type of prediction mode includes modes involving time domain motion vectors, such as TMVP mode, BDOF mode, DMVR mode; and the second type of prediction mode includes modes involving scaling the time domain motion vectors, such as SMVD mode.

It should be noted that, in an example, the second type of prediction mode may also be allowed to be used when the condition for using the time domain reference picture is satisfied.

In a possible implementation, after determining whether the condition for scaling the motion vector of the time domain reference picture is satisfied, the method further includes:
  if the condition for scaling the motion vector of the time domain reference picture is satisfied, allowing to use the first type of prediction mode and the second type of prediction mode; and if the condition for scaling the motion vector of the time domain reference picture is not satisfied, refusing to use the second type of prediction mode.

In an example, when the condition for scaling the motion vector of the time domain reference picture is not satisfied, the first type of prediction mode may also be refused.

Embodiment 18

Figure 9:
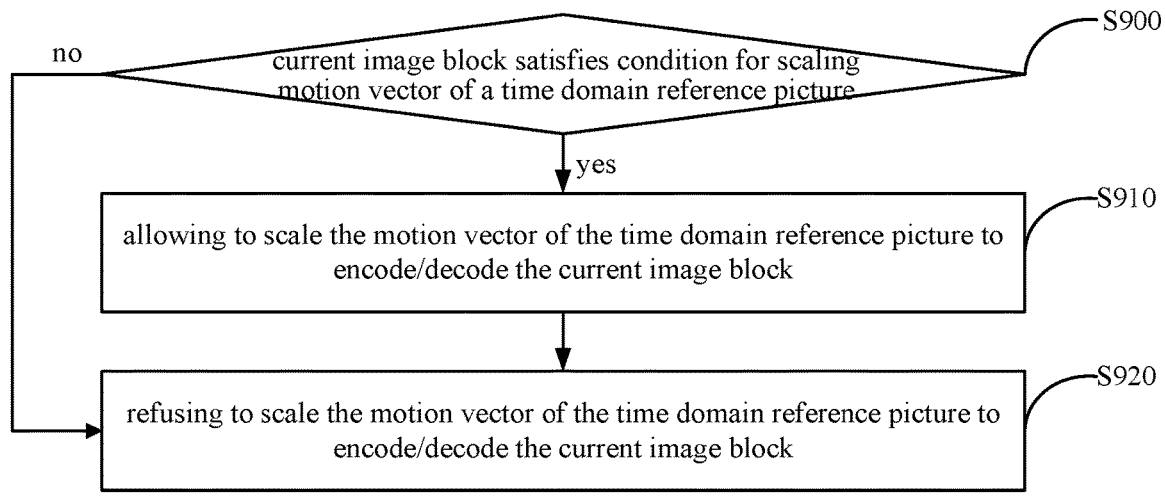
FIG. 9 is a schematic flowchart of a method for selecting candidate motion vectors according to an exemplary embodiment of the present application.

Referring to FIG. 9, a schematic flowchart of a candidate motion vector selection method provided in an embodiment of the present application is shown, and as shown in FIG. 9, the candidate motion vector selection method may include the following steps:
  step S900: determining whether the current image block satisfies the condition for scaling the motion vector of the time domain reference picture, if the current image block satisfies the condition for scaling the motion vector of the time domain reference picture, going to step S910; if the current image block does not satisfy the condition for scaling the motion vector of the time domain reference picture, going to step S920;
  step S910: allowing to scale the motion vector of the time domain reference picture to encode/decode the current image block; and step S920: refusing to scale the motion vector of the time domain reference picture to encode/decode the current image block.

In the embodiment of the present application, the scaled motion vector of the time domain reference picture being finally selected is low in some specific situations. Therefore, in order to improve the encoding and decoding performance, and avoid using the scaled motion vector of the time domain reference picture as a candidate motion vector under a condition that the scaled motion vector of the time domain reference picture is not applicable, a condition (referred to as the condition for scaling the motion vector of the time domain reference picture herein) for allowing to use the scaled motion vector of the time domain reference picture may be set in advance.

In an example, the condition for scaling the motion vector of the time domain reference picture may include:

the size of the reference picture is the same as the size of a picture to which the current image block belongs, and the reference picture is not a long-term reference picture.

For example, the scaled motion vector of the time domain reference picture being finally selected is low when the size of the reference picture is different from the size of the picture to which the current image block belongs, and/or the reference picture is a long-term reference picture. Therefore, the size of the reference picture being the same as the size of the picture to which the current image block belongs and the reference picture being not a long-term reference picture is used as the condition for scaling the motion vector of the time domain reference picture.

When the size of the reference picture is the same as the size of the picture to which the current image block belongs and the reference picture is not a long-term reference picture, the scaled motion vector of the time domain reference picture is allowed to be used for encoding/decoding the current image block; and when the size of the reference picture is different from the size of a picture to which the current image block belongs or/and the reference picture is a long-term reference picture, the scaled motion vector of the time domain reference picture is refused to be used for encoding/decoding the current image block.

In a possible implementation, after determining whether the condition for scaling the motion vector of the time domain reference picture is satisfied, the method further includes:

if the condition for scaling the motion vector of the time domain reference picture is satisfied, allowing to use the first type of prediction mode and the second type of prediction mode; and if the condition for scaling the motion vector of the time domain reference picture is not satisfied, refusing to use the second type of prediction mode.

In an example, the first type of prediction mode includes modes involving time domain motion vectors, such as TMVP mode, BDOF mode, DMVR mode, etc.; and the second type of prediction modes include modes involving scaling the time domain motion vectors, such as the SMVD mode.

In an example, when the condition for scaling the motion vector of the time domain reference picture is not satisfied, the first type of prediction mode may also be refused.

Embodiment 19

Figure 10:
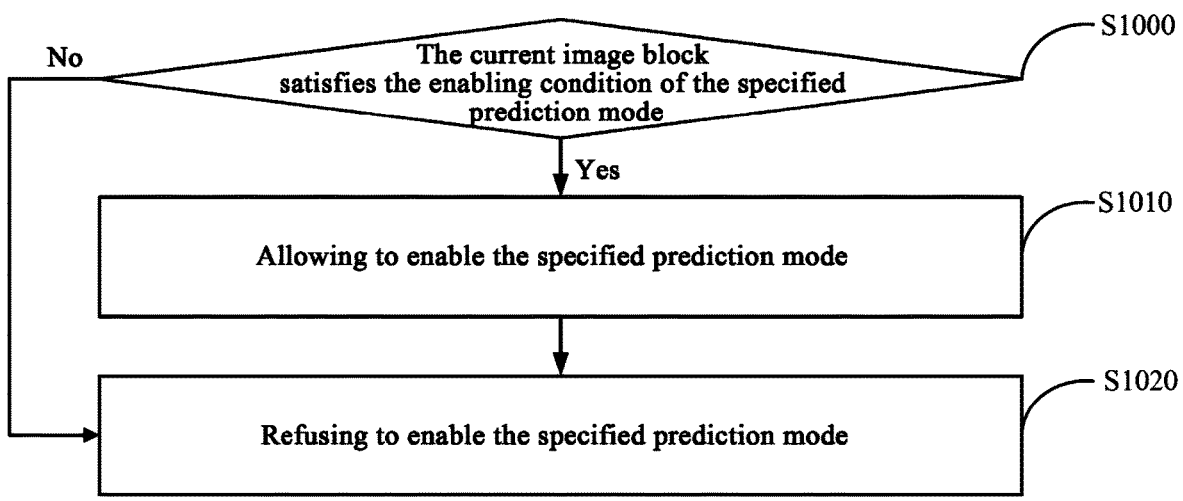
FIG. 10 is a schematic flowchart of a method for selecting a prediction mode according to an exemplary embodiment of the present application.

Referring to FIG. 10, a schematic flowchart of a prediction mode selection method according to an embodiment of the present application is shown, and as shown in FIG. 10, the prediction mode selection method may include the following steps:

step S1000: determining whether the current image block satisfies the enabling condition for a specified prediction mode, if the current image block satisfies the enabling condition for the specified prediction mode, going to step S1010; if the current image block does not satisfy the enabling condition for the specified prediction mode, going to step S1020;

step S1010: allowing to use the specified prediction mode; and step S1020: refusing to use the specified prediction mode.

The use of the specific prediction mode may reduce the encoding and decoding performance in some specific situations. Therefore, in order to improve the encoding and decoding performance, and avoid using the specified prediction mode as a candidate prediction mode under a condition that the specified prediction mode is not applicable, the condition (referred to as the condition for using the specified prediction mode herein) whether to allow the specified prediction mode to be used may be set in advance.

In a possible implementation, the specified prediction mode includes the first type of prediction mode.

For example, the first type of prediction mode includes modes involving time domain motion vectors, such as the TMVP mode, the BDOF mode, the DMVR mode, etc.

In an example, the condition for using the specified prediction mode may include:

the size of the reference picture is the same as the size of the picture to which the current image block belongs.

For example, encoding/decoding performance of using the first type of prediction mode is low when the size of the reference picture is different from the size of the picture to which the current image block belongs. Therefore, in order to improve the encoding/decoding performance, the size of the reference picture being the same as the size of the picture to which the current image block belongs may be used as the condition for using the specified prediction mode. That is, when the size of the reference picture is the same as the size of the picture to which the current image block belongs, the specified prediction mode is allowed to be used; when the size of the reference picture is different from the size of the picture to which the current image block belongs, the specified prediction mode is refused to be used.

In another example, the condition for using the specified prediction mode may further include:

the reference picture is not a long-term reference picture.

For example, encoding and decoding performance of using the first type of prediction mode is lower when the size of the reference picture is the same as the size of the picture to which the current image block belongs but the reference picture is a long-term reference picture. Therefore, the reference picture being not a long-term reference picture may further be used as the condition for using the specified prediction mode. That is, when the size of the reference picture is the same as the size of the picture to which the current image block belongs and the reference picture is not a long-term reference picture, the specified prediction mode is allowed to be used; and when the size of the reference picture is different from the size of the picture to which the current image block belongs and/or the reference picture is a long-term reference picture, the specified prediction mode is refused to be used.

In another possible implementation, the specified prediction mode includes the first type of prediction mode and the second type of prediction mode.

For example, the second type of prediction mode includes modes involving scaling the time domain motion vectors, such as the SMVD mode.

In an example, the condition for using the specified prediction mode may include:

the size of the reference picture is the same as the size of the picture to which the current image block belongs, and the reference picture is not a long-term reference picture.

For example, encoding and decoding performance using the first type of prediction mode and the second type of prediction mode is low when the size of the reference picture is different from the size of the picture to which the current image block belongs, and/or the reference picture is a long-term reference picture. Therefore, the size of the reference picture being the same as the size of the picture to which the current image block belongs and the reference picture being not a long-term reference picture may be used as the condition for using the specified prediction mode.

When the size of the reference picture is the same as the size of the picture to which the current image block belongs and the reference picture is not a long-term reference picture, the specified prediction mode is allowed to be used; and when the size of the reference picture is different from the size of the picture to which the current image block belongs and/or the reference picture is a long-term reference picture, the specified prediction mode is refused to be used.

In another possible embodiment, the specified prediction mode includes the second type of prediction mode.

In an example, the condition for using the specified prediction mode may include:

the size of the reference picture is the same as the size of the picture to which the current image block belongs, and the reference picture is not a long-term reference picture.

For example, encoding and decoding performance using the second type of prediction mode is low when the size of the reference picture is different from the size of the picture to which the current image block belongs, or/and the reference picture is a long-term reference picture. Therefore, the size of the reference picture is the same as the size of the picture to which the current image block belongs, and the reference picture is not a long-term reference picture may be used as the condition for using the specified prediction mode.

When the size of the reference picture is the same as the size of the picture to which the current image block belongs and the reference picture is not a long-term reference picture, the specified prediction mode is allowed to be used; and when the size of the reference picture is different from the size of the picture to which the current image block belongs or/and the reference picture is a long-term reference picture, the specified prediction mode is refused to be used.

Embodiment 20

Figure 11:
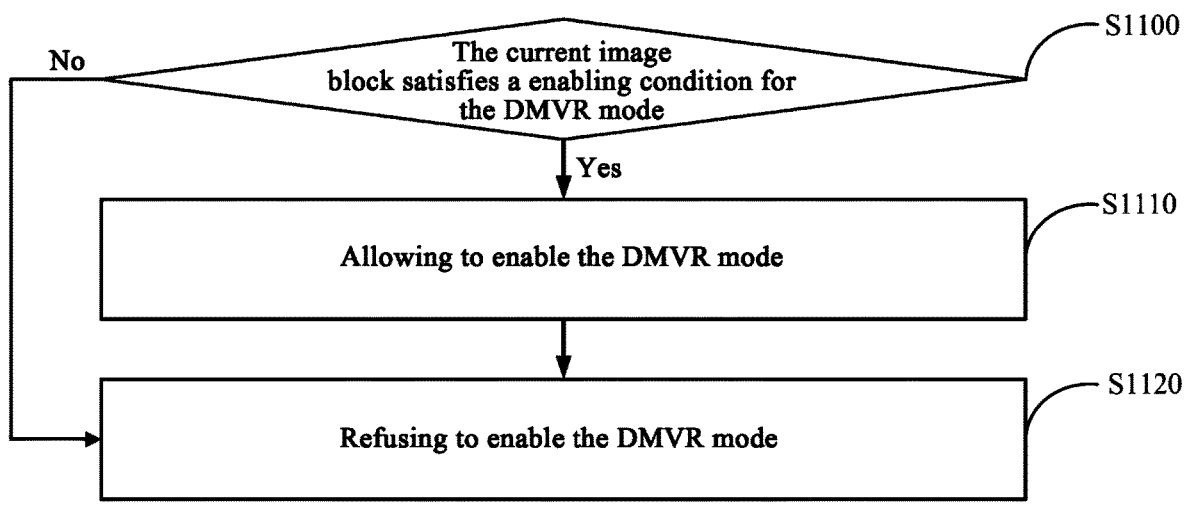
FIG. 11 is a schematic flowchart of a method for selecting a prediction mode according to an exemplary embodiment of the present application.

Referring to FIG. 11, a schematic flowchart of a prediction mode selection method according to an embodiment of the present application is shown, and as shown in FIG. 11, the prediction mode selection method may include the following steps:

step S1100: determining whether the current image block satisfies an enabling condition for DMVR mode, if the current image block satisfies the enabling condition for DMVR mode, going to step S1110; if the current image block does not satisfy the enabling condition for DMVR mode, going to step S1120;

step S1110: allowing to use the DMVR mode; and step S1120: refusing to use the DMVR mode.

In the embodiment of the present application, decoding efficiency using the DMVR mode is lower in some specific situations. In order to improve the encoding and decoding performance and avoid enabling the DMVR mode when DMVR mode is not applicable, an enabling condition for DMVR mode may be set in advance.

Accordingly, when the current image block is decoded, whether the current image block satisfies the enabling condition for DMVR mode may be determined. If the current image block satisfies the enabling condition for DMVR mode, the DMVR mode is allowed to be used; if the current image block does not satisfy the enabling condition for DMVR mode, the DMVR mode is refused to be used.

In an example, the enabling condition for DMVR mode may include:

a current mode is a general merge/skip mode.

The general merge/skip modes are the general-merge-mode and the general-skip-mode. In the general-merge-mode or the general-skip-mode, motion information is selected from the candidate motion information list, and the prediction value of the current image block is generated based on the motion information.

The candidate motion information list includes: spatial neighboring block candidate motion information, time domain neighboring block candidate motion information, spatial non-neighboring block candidate motion information, motion information obtained by combining the existing motion information, or/and default motion information, and the like.

For example, when the current image block is determined to be in the general merge/skip mode, the DMVR mode is allowed to be used; otherwise, the DMVR mode is refused to be used.

In another example, the enabling condition for DMVR mode may include:

a switch for controlling the DMVR mode at a sequence level is of a first numerical value, and a switch for picture header control DMVR mode is of the first numerical value;

the current mode is the general merge/skip mode;

the current image block uses a bidirectional prediction mode, the display order of one of two reference pictures is previous to the picture to which the current image block belongs, the display order of the other of the two reference pictures is subsequent to the picture to which the current image block belongs, and the distances between the two reference pictures and the picture to which the current image block belongs are equal;

weighted weights of the two reference pictures are the same;

the size of the current image block satisfies a limiting condition; and the length and width of the two reference pictures are the same as the length and width of the picture to which the current image block belongs respectively.

In an example, the first value is 1.

In an example, the size of the current image block satisfying the limiting condition includes: the width of the current image block is greater than or equal to 8, the height of the current image block is greater than or equal to 8, and the area of the current image block is greater than or equal to 128.

In the embodiment of the present application, after the prediction values of pixel points of the current image block are determined, prediction compensation values of pixel points of the current image block are determined based on gradient values and offset vectors of pixel points of the current image block, and then final prediction values of pixel points of the current image block are determined based on prediction values and prediction compensation values of pixel points of the current image block. The prediction compensation adjustment is no longer limited to an image block using the bidirectional prediction mode, and is not limited to an image block for which the motion vector of each sub-block is the same as the motion vector of each pixel in the corresponding sub-block, which expands application scope of prediction compensation adjustment.

The method according to the present application is described above. An apparatus according to the present application is described below.

Figure 12:
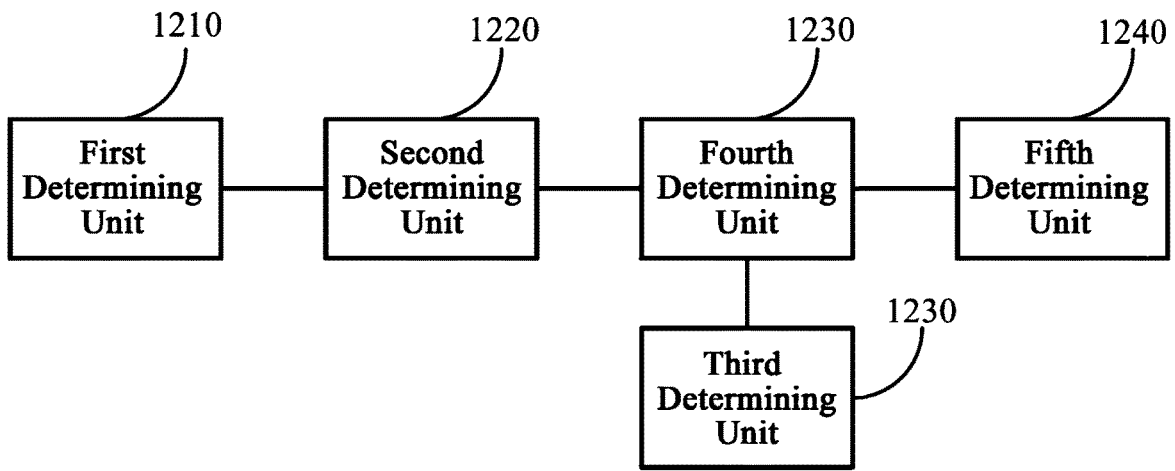
FIG. 12 is a schematic structural diagram of an encoding and decoding apparatus according to an exemplary embodiment of the present application.

Referring to FIG. 12, a schematic structural diagram of an encoding and decoding apparatus according to an embodiment of the present application is shown, as show in FIG. 12, the encoding and decoding apparatus may include:

- a first determining unit 1210 configured for determining prediction values of pixel points of a current image block;
- a second determining unit 1220 configured for determining gradient values of pixel points of the current image block based on the prediction values of pixel points of the current image block;
- a third determining unit 1230 configured for determining offset vectors of pixel points of the current image block;
- a fourth determining unit 1240 configured for determining prediction compensation values of pixel points of the current image block based on the gradient values and the offset vectors of pixel points of the current image block; and a fifth determining unit 1250 configured for determining final prediction values of pixel points of the current image block based on the prediction values and the prediction compensation values of pixel points of the current image block.

In a possible embodiment, if the current image block uses a unidirectional prediction mode.

The first determining unit 1210 is specifically configured for determining unidirectional prediction values of pixel points of the current image block.

The second determining unit 1220 is specifically configured for determining gradient values of pixel points of the current image block in the direction based on the unidirectional prediction values of pixel points of the current image block.

The third determining unit 1230 is specifically configured for determining offset vectors of pixel points of the current image block in the direction.

The fourth determining unit 1240 is specifically configured for determining prediction compensation values of pixel points of the current image block in the direction based on the gradient values and offset vectors of pixel points of the current image block in the direction.

The fifth determining unit 1250 is specifically configured for determining final prediction values of pixel points of the current image block in the direction based on the prediction values and prediction compensation values of pixel points of the current image block in the direction.

In a possible embodiment, if the current image block uses a bidirectional prediction mode.

The first determining unit 1210 is specifically configured for determining forward prediction values and backward prediction values of pixel points of the current image block respectively.

The second determining unit 1220 is specifically configured for determining forward gradient values and backward gradient values of pixel points of the current image block based on the forward prediction values and the backward prediction values of pixel points of the current image block respectively.

The third determining unit 1230 is specifically configured for determining forward offset vectors and backward offset vectors of pixel points of the current image block respectively.

The fourth determining unit 1240 is specifically configured for determining forward prediction compensation values and backward prediction compensation values of pixel points of the current image block based on the forward gradient values, backward gradient values, forward offset vectors and backward offset vectors of pixel points of the current image block respectively.

The fifth determining unit 1250 is specifically configured for determining forward final prediction values and backward final prediction values of pixel points of the current image block based on the forward prediction values, backward prediction values, forward prediction compensation values and backward prediction compensation values of pixel points of the current image block respectively; and determining final prediction values of pixel points of the current image block based on the forward final prediction values and backward final prediction values of pixel points of the current image block.

In a possible implementation, the third determining unit 1230 is specifically configured for:

- for each sub-block of the current image block, determining an offset vector of a specified pixel point in the sub-block; and
- determining offset vectors of the other pixel points in the sub-block based on the offset vector of the specified pixel point in the sub-block.

In a possible implementation, the third determining unit 1230 is specifically configured for determining the offset vector of the specified pixel point in the sub-block based on Affine parameters and an offset of the specified pixel point from a center position of the sub-block.

In a possible implementation, the third determining unit 1230 is specifically configured for:

- determining a horizontal component of the offset vector of the specified pixel point in the sub-block based on a horizontal offset of the specified pixel point from the center position of the sub-block, a vertical offset of the specified pixel point from the center position of the sub-block, a first Affine parameter and a second Affine parameter; and
- determining a vertical component of the offset vector of the specified pixel point in the sub-block based on a horizontal offset of the specified pixel point from the center position of the sub-block in the horizontal direction, a vertical offset of the specified pixel point from the center position of the sub-block, a third Affine parameter and a fourth Affine parameter.

In a possible implementation, for a 4-parameter Affine model, the first Affine parameter and the fourth Affine parameter are the same and are equal to a ratio of a first numerical value to the width of the sub-block, the second Affine parameter and the third Affine parameter are opposite, and the third Affine parameter is a ratio of a second numerical value to the width of the sub-block;

wherein the first numerical value is a difference between a horizontal component of a motion vector of an upper right control point of the sub-block and a horizontal component of a motion vector of an upper left control point of the sub-block, and the second numerical value is a difference between a vertical component of the motion vector of the upper right control point of the sub-block and a vertical component of the motion vector of the upper left control point of the sub-block.

In a possible implementation, for a 6-parameter Affine model, the first Affine parameter is a ratio of a first numerical value to the width of the sub-block, the second Affine parameter is a ratio of a third numerical value to the height of the sub-block, the third Affine parameter is a ratio of a second numerical value to the width of the sub-block, and the fourth Affine parameter is a ratio of a fourth numerical value to the height of the sub-block;
wherein the first numerical value is a difference between a horizontal component of a motion vector of an upper right control point of the sub-block and a horizontal component of a motion vector of an upper left control point of the sub-block, the second numerical value is a difference between a vertical component of the motion vector of the upper right control point of the sub-block and a vertical component of the motion vector of the upper left control point of the sub-block, the third numerical value is a difference between a horizontal component of the motion vector of a lower left control point of the sub-block and a horizontal component of the motion vector of the upper left control point of the sub-block, and the fourth numerical value is a difference between a vertical component of the motion vector of the lower left control point of the sub-block and a vertical component of the motion vector of the upper left control point of the sub-block.

In a possible implementation, the third determining unit 1230 is specifically configured for:
determining horizontal components of offset vectors of other pixel points in the row of the specified pixel point in the sub-block based on the horizontal component of the offset vector of the specified pixel point in the sub-block and the first Affine parameter;
determining vertical components of offset vectors of other pixel points in the row of the specified pixel point in the sub-block based on the vertical component of the offset vector of the specified pixel point in the sub-block and the third Affine parameter; and
determining, for each pixel point in the row of the specified pixel point, horizontal components of offset vectors of other pixel points in the column of the pixel point in the sub-block based on the horizontal component of the offset vector of the pixel point and the second Affine parameter; and determining vertical components of offset vectors of other pixel points in the column of the pixel point in the sub-block based on the vertical component of the offset vector of the pixel point and the fourth Affine parameter.

In a possible implementation, the second determining unit 1220 is specifically configured for filling for each sub-block of the current image block, N row(s)/column(s) of integer pixel points on each of the top, bottom, left and right edges of the sub-block; wherein N is a positive integer; and
determining gradient values of pixel points in the sub-block based on prediction values of pixel points of the sub-block and pixel values of the filled integer pixel points.

In a possible implementation, the second determining unit 1220 is specifically configured for:

determining, in a reference picture, an integer pixel block closest to and having the same size as the sub-block; and
taking pixel values of N row(s)/column(s) of integer pixel points adjacent to the integer-pixel block as filling pixel values of the pixel points on the top, bottom, left and right edges of the sub block respectively.

In a possible implementation, the second determining unit 1220 is specifically configured for:
filling respectively N row(s)/column(s) of integer pixel points that are exactly above, below, left to and right to the integer-pixel block respectively.

In a possible implementation, when N=1, the second determining unit 1220 is specifically configured for:
a sub-pixel vertical component of a prediction value of a pixel point in the sub-block is greater than a half pixel, filling a nearest integer pixel point above the top edge of the sub-block, and filling a next nearest integer pixel point below the bottom edge of the sub-block;
if a sub-pixel vertical component of a prediction value of a pixel point in the sub-block is smaller than a half pixel, filling a next nearest integer pixel point above the top edge of the sub-block, and filling a nearest integer pixel point below the bottom edge of the sub-block;
if a sub-pixel horizontal component of a prediction value of a pixel point in the sub-block is greater than a half pixel, filling a nearest integer pixel point at the left of the left edge of the sub-block, and filling a next nearest integer pixel point at the right of the right edge of the sub-block; and
if a sub-pixel horizontal component of a prediction value of a pixel point in the sub-block is smaller than a half pixel, filling a next nearest integer pixel point at the left of the left edge of the sub-block, and filling a nearest integer pixel point at the right of the right edge of the sub-block.

In a possible implementation, the second determining unit 1220 is specifically configured for:
determining, for each pixel point in the sub-block, a horizontal component of a gradient value of the pixel point based on pixel values of N adjacent pixel points at the left of the pixel point and pixel values of N adjacent pixel points at the right of the pixel point, and determining a vertical component of the gradient value of the pixel point based on pixel values of N adjacent pixel points above the pixel point and pixel values of N adjacent pixel points below the pixel point.

In a possible implementation, the second determining unit 1220 is further configured for:
determining whether the current image block satisfies an enabling condition for prediction compensation adjustment; and
if the current image block satisfies the enabling condition for prediction compensation adjustment, performing the operation of determining gradient values of pixel points of the current image block based on the prediction values of pixel points of the current image block.

In a possible implementation, the enabling condition for prediction compensation adjustment comprises: a specified prediction mode is applied to the current image block, and in the specified prediction mode, a motion vector of a sub-block is not identical to a motion vector of any pixel point in the sub-block.

In a possible implementation, the enabling condition for prediction compensation adjustment further comprises: the currently predicted component is a luminance component.

In a possible implementation, the enabling condition for prediction compensation adjustment further comprises: the currently predicted component is a chrominance component.

In a possible implementation, the specified prediction mode comprises an Affine motion mode.

Figure 13:
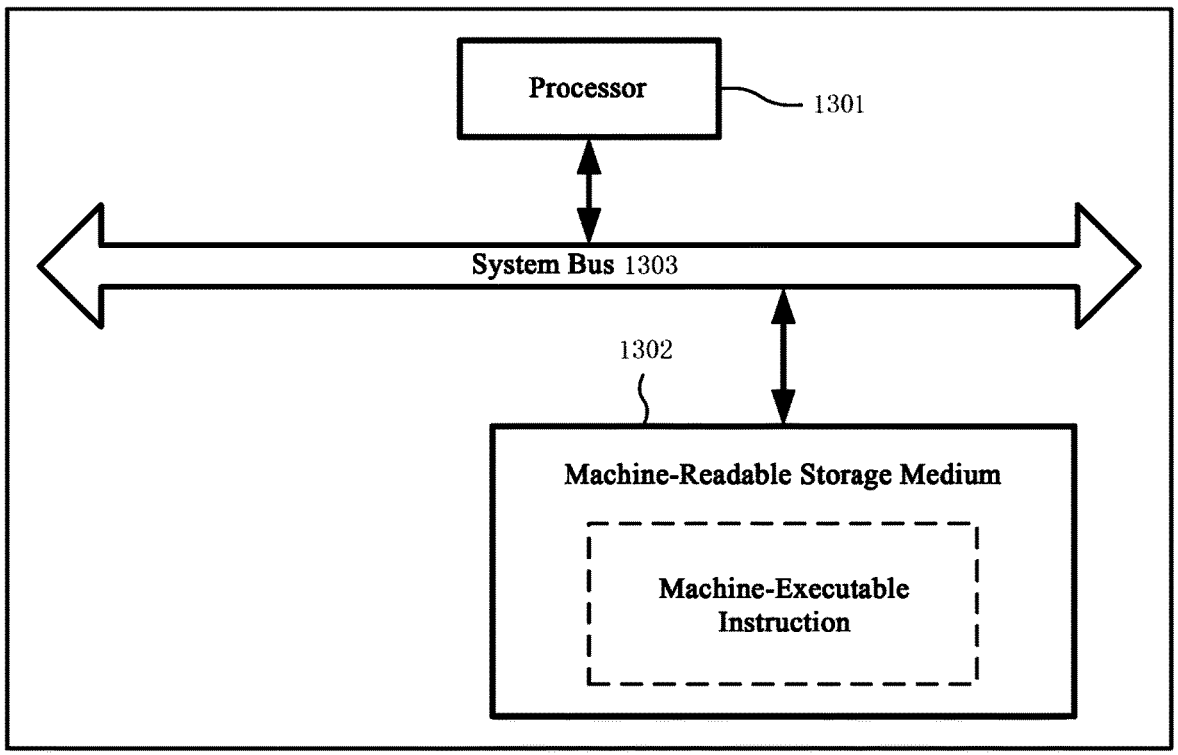
FIG. 13 is a schematic diagram of a hardware structure of an encoding side device according to an exemplary embodiment of the present application.

Referring to FIG. 13, a schematic diagram of the hardware structure of an encoding device according to an embodiment of the present application is shown. The encoding side device may include a processor 1301, a machine-readable storage medium 1302 storing machine-executable instructions. The processor 1301 and the machine-readable storage medium 1302 may communicate with each other via a system bus 1303. Moreover, the processor 1301 may perform the encoding and decoding method described above by reading and executing machine-executable instructions in the machine-readable storage medium 1302 corresponding to the encoding and decoding control logic.

The machine-readable storage medium 1302 referred to herein may be any electronic, magnetic, optical, or other physical storages that may contain or store information such as executable instructions, data, and the like. For example, the machine-readable storage medium may be: a Random Access Memory (RAM), a volatile memory, a nonvolatile memory, a flash memory, a storage drive (e.g., a hard drive), a solid-state disk, a storage disk of any type (e.g., an optical disk, DVD, etc.), or a similar storage medium, or a combination thereof.

Figure 14:
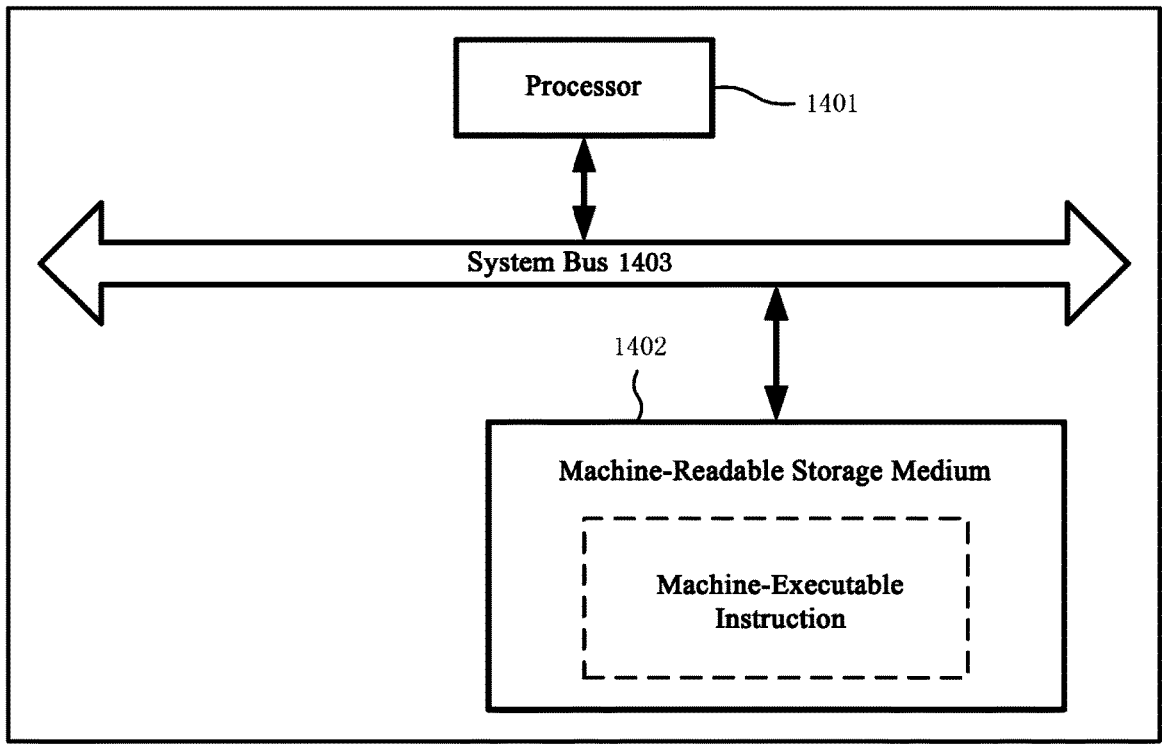
FIG. 14 is a schematic diagram of a hardware structure of a decoding side device according to an exemplary embodiment of the present application.

Referring to FIG. 14, which is a schematic diagram of a hardware structure of a decoding side device according to an embodiment of the present application. The decoding side device may include a processor 1401, a machine-readable storage medium 1402 storing machine-executable instructions. The processor 1401 and the machine-readable storage medium 1402 may intercommunicate via a system bus 1403. Moreover, the processor 1401 may perform the encoding and decoding method described above by reading and executing machine-executable instructions in the machine-readable storage medium 1402 corresponding to the encoding and decoding control logic.

The machine-readable storage medium 1402 referred to herein may be any electronic, magnetic, optical, or other physical storages that may contain or store information such as executable instructions, data, and the like. For example, the machine-readable storage medium may be: a RAM, a volatile memory, a nonvolatile memory, a flash memory, a storage drive (e.g., a hard drive), a solid-state disk, a storage disk of any type (e.g., an optical disk, DVD, etc.), or a similar storage medium, or a combination thereof.

It should be noted that, relational terms such as first and second, and the like in the text are only used to distinguish one entity or action from another entity or action without necessarily requiring or implying any actual such relationship or order between such entities or actions. Moreover, the terms "comprises", "comprising", or any other variation thereof, are intended to cover a non-exclusive inclusion, such that a process, method, article, or device that comprises a list of elements does not include only those elements but may include other elements not expressly listed or may include elements that inherent to such process, method, article, or device. Without further limitation, an element defined by the phrase "comprising an . . ." does not exclude the presence of other identical elements in the process, method, article, or apparatus that comprises the element.

The above is only the preferred embodiment of the present application and are not intended to limit the present application, and any modifications, equivalents, improvements and the like made within the spirit and principle of the present application should be included in the protection scope of the present application.

What is claimed is:

1. A decoding method, which is performed by a decoding side device for decoding a current image block, wherein the decoding side device comprises a processor, a machine-readable storage medium storing machine-executable instructions, the processor and the machine-readable storage medium communicate via a system bus, the processor performs the decoding method by reading and executing machine-executable instructions in the machine-readable storage medium corresponding to a decoding control logic, the method comprises:

when decoding the current image block, determining, by the processor, whether to enable a Bi-directional Optical Flow mode for decoding the current image block;

in response to determining, by the processor, for all reference pictures and sizes of reference pictures, that a size of a reference picture of the current image block is the same as a size of a picture to which the current image block belongs and the reference picture is not a long-term reference picture when decoding the current image block, requiring the processor to use the Bi-directional Optical Flow mode for decoding the current image block;

in response to determining, by the processor, for all reference pictures and sizes of reference pictures, that the size of the reference picture of the current image block is different from the size of the picture to which the current image block belongs when decoding the current image block, refusing the processor to use the Bi-directional Optical Flow mode for decoding the current image block;

in response to determining, by the processor, for all reference pictures and sizes of reference pictures, that the reference picture of the current image block is a long-term reference picture when decoding the current image block, refusing the processor to use the Bi-directional Optical Flow mode for decoding the current image block;

in response to determining, by the processor, for all reference pictures and sizes of reference pictures, that the size of the reference picture of the current image block is different from the size of the picture to which the current image block belongs, and the reference picture of the current image block is a long-term reference picture when decoding the current image block, refusing the processor to use the Bi-directional Optical Flow mode for decoding the current image block;

the requiring the processor to use the Bi-directional Optical Flow mode for decoding the current image block comprises:

for a plurality of sub-blocks divided from the current image block, determining, for each sub-block, a prediction value of each pixel point in the sub-block and a prediction compensation value of each pixel point in the sub-block, and determining a final prediction value of the sub-block based on the prediction value of each pixel point in the sub-block and the prediction compensation value of each pixel point in the sub-block, wherein, the prediction compensation value of each pixel point in the sub-block is determined based on a gradient value and an offset vector of each pixel point in the sub-block, the gradient value of each pixel point in the sub-block is determined based on the prediction value of each pixel point in the sub-block, and the prediction value of each pixel point in the sub-block is determined based on motion information of the current image block;

wherein, determining the gradient value of each pixel point in the sub-block comprises: filling 1 row/column of integer pixel points on the top, bottom, left and right edges of a 4*4 sub-block respectively to obtain a corresponding 6*6 block, and calculating a gradient value of each pixel point in the 4*4 sub-block based on a pixel value of each pixel point in the 6*6 block.

2. The method according to claim 1, wherein, the method further comprises:

if the Bi-directional Optical Flow mode is required to be used, determining a final prediction value of the current image block by the following steps:

determining a prediction value of each pixel point of the current image block;

determining a gradient value of each pixel point of the current image block based on the prediction value of each pixel point of the current image block;

determining an offset vector of each pixel point of the current image block;

determining a prediction compensation value of each pixel point of the current image block based on the gradient value and the offset vector of each pixel point of the current image block; and determining a final prediction value of each pixel point of the current image block based on the prediction value and the prediction compensation value of each pixel point of the current image block.

3. The method according to claim 1, wherein, the current image block is a decoding block obtained by dividing using one of quadtree division, horizontal binary tree division, vertical binary tree division, horizontal trigeminal tree division, or vertical ternary tree division;

wherein, the Bi-directional Optical Flow mode refers to a mode for adjusting a motion compensation value by an optical flow method based on motion compensation values of two reference pictures of the current image block.

4. An encoding method, which is performed by an encoding side device for encoding a current image block, wherein the encoding side device comprises a processor, a machine-readable storage medium storing machine-executable instructions, the processor and the machine-readable storage medium communicate via a system bus, the processor performs the encoding method by reading and executing machine-executable instructions in the machine-readable storage medium corresponding to an encoding control logic, the method comprises:

when encoding the current image block, determining, by the processor, whether to enable a Bi-directional Optical Flow mode for encoding the current image block, in response to determining, by the processor, for all reference pictures and sizes of reference pictures, that a size of a reference picture of the current image block is the same as a size of a picture to which the current image block belongs and the reference picture is not a long-term reference picture when encoding the current image block, requiring the processor to use the Bi-directional Optical Flow mode for encoding the current image block;

in response to determining, by the processor, for all reference pictures and sizes of reference pictures, that the size of the reference picture of the current image block is different from the size of the picture to which the current image block belongs when encoding the current image block, refusing the processor to use the Bi-directional Optical Flow mode for encoding the current image block;

in response to determining, by the processor, for all reference pictures and sizes of reference pictures, that the reference picture of the current image block is a long-term reference picture when encoding the current image block, refusing the processor to use the Bi-directional Optical Flow mode for encoding the current image block;

in response to determining, by the processor, for all reference pictures and sizes of reference pictures, that the size of the reference picture of the current image block is different from the size of the picture to which the current image block belongs, and the reference picture of the current image block is a long-term reference picture when encoding the current image block, refusing the processor to use the Bi-directional Optical Flow mode for encoding the current image block;

the requiring the processor to use the Bi-directional Optical Flow mode for encoding the current image block comprises:

for a plurality of sub-blocks divided from the current image block, determining, for each sub-block, a prediction value of each pixel point in the sub-block and a prediction compensation value of each pixel point in the sub-block, and determining a final prediction value of the sub-block based on the prediction value of each pixel point in the sub-block and the prediction compensation value of each pixel point in the sub-block, wherein, the prediction compensation value of each pixel point in the sub-block is determined based on a gradient value and an offset vector of each pixel point in the sub-block, the gradient value of each pixel point in the sub-block is determined based on the prediction value of each pixel point in the sub-block, and the prediction value of each pixel point in the sub-block is determined based on motion information of the current image block;

wherein, determining the gradient value of each pixel point in the sub-block comprises: filling I row/column of integer pixel points on the top, bottom, left and right edges of a 4*4 sub-block respectively to obtain a corresponding 6*6 block, and calculating a gradient value of each pixel point in the 4*4 sub-block based on a pixel value of each pixel point in the 6*6 block.

5. A decoding device comprising a processor and a machine-readable storage medium storing machine-executable instructions executable by the processor, wherein, the processor is configured to execute the machine-executable instructions to implement the method according to claim 1.

6. An encoding device comprising a processor and a machine-readable storage medium storing machine-executable instructions executable by the processor, wherein, the processor is configured to execute the machine-executable instructions to implement the method according to claim 4.

7. A non-transitory storage medium having instructions stored thereon, wherein, when executed by a processor, implement the method which is performed by a decoding side device for decoding a current image block, wherein the decoding side device comprises a processor, a machine-readable storage medium storing machine-executable instructions, the processor and the machine-readable storage medium communicate via a system bus, the processor performs the decoding method by reading and executing machine-executable instructions in the machine-readable storage medium corresponding to a decoding control logic, the method comprises:

when decoding the current image block, determining, by the processor, whether to enable a Bidirectional Optical Flow mode for decoding the current image block;

in response to determining, by the processor, for all reference pictures and sizes of reference pictures, that a size of a reference picture of the current image block is the same as a size of a picture to which the current image block belongs and the reference picture is not a long-term reference picture when decoding the current image block, requiring the processor to use the Bi-directional Optical Flow mode for decoding the current image block;

in response to determining, by the processor, for all reference pictures and sizes of reference pictures, that the size of the reference picture of the current image block is different from the size of the picture to which the current image block belongs when decoding the current image block, refusing the processor to use the Bi-directional Optical Flow mode for decoding the current image block;

in response to determining, by the processor, for all reference pictures and sizes of reference pictures, that the reference picture of the current image block is a long-term reference picture when decoding the current image block, refusing the processor to use the Bi-directional Optical Flow mode for decoding the current image block;

in response to determining, by the processor, for all reference pictures and sizes of reference pictures, that the size of the reference picture of the current image block is different from the size of the picture to which the current image block belongs, and the reference picture of the current image block is a long-term reference picture when decoding the current image block, refusing the processor to use the Bi-directional Optical Flow mode for decoding the current image block;

the requiring the processor to use the Bi-directional Optical Flow mode for decoding the current image block comprises:

for a plurality of sub-blocks divided from the current image block, determining, for each sub-block, a prediction value of each pixel point in the sub-block and a prediction compensation value of each pixel point in the sub-block, and determining a final prediction value of the sub-block based on the prediction value of each pixel point in the sub-block and the prediction compensation value of each pixel point in the sub-block, wherein, the prediction compensation value of each pixel point in the sub-block is determined based on a gradient value and an offset vector of each pixel point in the sub-block, the gradient value of each pixel point in the sub-block is determined based on the prediction value of each pixel point in the sub-block, and the prediction value of each pixel point in the sub-block is determined based on motion information of the current image block;

wherein, determining the gradient value of each pixel point in the sub-block comprises: filling 1 row/column of integer pixel points on the top, bottom, left and right edges of a 4*4 sub-block respectively to obtain a corresponding 6*6 block, and calculating a gradient value of each pixel point in the 4*4 sub-block based on a pixel value of each pixel point in the 6*6 block.

\* \* \* \* \*